(12) United States Patent
Black et al.

(10) Patent No.: US 11,145,020 B1
(45) Date of Patent: Oct. 12, 2021

(54) PREDICTIVE COMMODITY CLASSIFICATION

(71) Applicant: United Parcel Service of America, Inc., Atlanta, GA (US)

(72) Inventors: Dale A. Black, Louisville, KY (US); Barry Bramble, Alpharetta, GA (US)

(73) Assignee: United Parcel Service, Inc., Atlanta, GA (US)

( * ) Notice: Subject to any disclaimer, the term of this patent is extended or adjusted under 35 U.S.C. 154(b) by 614 days.

(21) Appl. No.: 15/950,883

(22) Filed: Apr. 11, 2018

Related U.S. Application Data

(60) Provisional application No. 62/484,159, filed on Apr. 11, 2017.

(51) Int. Cl.
*G06Q 50/26* (2012.01)
*G06Q 10/08* (2012.01)
*G06N 5/02* (2006.01)
*G06N 20/00* (2019.01)

(52) U.S. Cl.
CPC ............. *G06Q 50/26* (2013.01); *G06N 5/022* (2013.01); *G06N 20/00* (2019.01); *G06Q 10/083* (2013.01)

(58) Field of Classification Search
CPC ...... G06Q 50/26; G06Q 10/083; G06N 20/00; G06N 5/022
See application file for complete search history.

(56) References Cited

U.S. PATENT DOCUMENTS

| | | | |
|---|---|---|---|
| 2003/0167240 A1* | 9/2003 | Napier | G06Q 10/08 705/404 |
| 2007/0210156 A1* | 9/2007 | Bochicchio | G06Q 10/08 235/385 |
| 2015/0019454 A1* | 1/2015 | Helseth | G06Q 10/0831 705/331 |
| 2017/0039500 A1* | 2/2017 | Leidner | G06F 16/951 |

OTHER PUBLICATIONS

Container Communities: Anti-tampering Wireless Sensor Network for Global Cargo Security Published by Department of Electrical Engineering and Computer Science (Year: 2009).*

* cited by examiner

*Primary Examiner* — Zeina Elchanti
(74) *Attorney, Agent, or Firm* — Shook, Hardy & Bacon L.L.P.

(57) ABSTRACT

Systems and methods for predicting commodity classifications for a shipment that increase the efficiency of clearing the shipment through a customs authority. Such systems and methods may utilize machine learning techniques to improve the accuracy of the predicted classifications.

20 Claims, 14 Drawing Sheets

| 85.04 700 | | Electrical transformers, static converters (for example, rectifiers) and inductors. |
|---|---|---|
| | 8504.10 | - Ballasts for discharge lamps or tubes |
| | | - Liquid dielectric transformers : |
| | 8504.21 | -- Having a power handling capacity not exceeding 650 kVA |
| | 8504.22 | -- Having a power handling capacity exceeding 650 kVA but not exceeding 10,000 kVA |
| | 8504.23 | -- Having a power handling capacity exceeding 10,000 kVA |
| | | - Other transformers : |
| | 8504.31 | -- Having a power handling capacity not exceeding 1 kVA |
| | 8504.32 | -- Having a power handling capacity exceeding 1 kVA but not exceeding 16 kVA |
| | 8504.33 | -- Having a power handling capacity exceeding 16 kVA but not exceeding 500 kVA |
| | 8504.34 | -- Having a power handling capacity exceeding 500 kVA |
| | 8504.40 | - Static converters |
| | 8504.50 | - Other inductors |
| | 8504.90 | - Parts |

Fig. 7B

| | | Coffee, tea, maté and spices |
|---|---|---|
| Notes. | | |
| 1.- Mixtures of the products of headings 09.04 to 09.10 are to be classified as follows : | | |
| (a) Mixtures of two or more of the products of the same heading are to be classified in that heading. | | |
| (b) Mixtures of two or more of the products of different headings are to be classified in heading 09.10. | | |
| The addition of other substances to the products of headings 09.04 to 09.10 (or to the mixtures referred to in paragraph (a) or (b) above) shall not affect their classification provided the resulting mixtures retain the essential character of the goods of those headings. Otherwise such mixtures are not classified in this Chapter, those constituting mixed condiments or mixed seasonings are classified in heading 21.03. | | |
| 2.- This Chapter does not cover Cubeb pepper (*Piper cubeba*) or other products of heading 12.11. | | |
| Heading 705 09.01 | H.S. Code 710 | Coffee, whether or not roasted or decaffeinated; coffee husks and skins; coffee substitutes containing coffee in any proportion. |
| | | - Coffee, not roasted : |
| | 0901.11 | -- Not decaffeinated |
| | 0901.12 | -- Decaffeinated |
| | | - Coffee roasted : |
| | 0901.21 | -- Not decaffeinated |
| | 0901.22 | -- Decaffeinated |
| | 0901.90 | - Other |

Fig. 7A

| Schedule B No. and Headings | Commodity Description |
|---|---|
| 09—700 | Coffee, Tea, Mate and Spices |
| 09.01—705 | - Coffee, whether or not roasted or decaffeinated; coffee husks and skins; coffee substitutes containing coffee in any proportion: |
| | - - Coffee, not roasted: |
| 0901.11.0000—800 | - - - Not decaffeinated |
| 0901.12.0000 | - - - Decaffeinated |
| 0901.21 | - - Coffee, roasted: |
| 0901.21.0010 | - - - Not decaffeinated: |
| 0901.21.0050 | - - - - Certified organic |
| 0901.22.0000 | - - - - Other |
| 0901.90 | - - Other: |
| 0901.90.1000 | - - - Coffee husks and skins |
| 0901.90.2000 | - - - Coffee substitutes containing coffee |

Fig. 8A

| Schedule B No. and Headings | Commodity Description | Unit of Quantity |
|---|---|---|
| | Section XVI - Chapter 85 | |
| 8504—815 | Electrical transformers, static converters (for example, recitifiers) and inductors; power supplies for automatic data processing machines or units thereof of heading 8471; parts thereof. | |
| 8504.10.0000 | Ballasts for discharge lamps or tubes | No. |
| 8504.21 | Liquid dielectric transformers:<br>Having a power handling capacity not exceeding 650 kVA: | |
| 8504.21.0020 | Having a power handling capacity not exceeding 50 kVA | No. |
| 8504.21.0040 | Having a power handling capacity exceeding 50 kVA but not exceeding 100 kVA | No. |
| 8504.21.0060 | Having a power handling capacity exceeding 100 kVA but not exceeding 500 kVA | No. |
| 8504.21.0080 | Having a power handling capacity exceeding 500 kVA but not exceeding 650 kVA | No. |

Fig. 8B

2. Special Tariff Programs and eligible countries.
Click on country group to see current country list.

| Code | Description | Eligible Country or Group |
|---|---|---|
| A | Generalized System of Preferences (GSP) (duty-free treatment). | GSP2016 |
| A+ | Only imports from least-developed beneficiary developing countries eligible for GSP under that subheading (duty-free treatment). | GSP2016_LEAST_DEV |
| AU | Australia Special Rate | Australia |
| B | Automotive Products Trade Act (APTA) (duty-free treatment) | Canada |
| BH | Bahrain Special Rate | Bahrain |
| C | Agreement on Trade in Civil Aircraft (duty-free treatment) | NTR (MFN) |
| CA | NAFTA for Canada (duty-free treatment) | Canada |
| CL | Chile Special Rate | Chile |
| CO | Colombia Special Rate | Colombia |
| D | Africa Growth and Opportunity Act (AGOA) (duty-free treatment) | AGOA2016 |
| E | Caribbean Basin Initiative (CBI) | CBERA |
| IL | Israel Special Rate (duty-free treatment) | Israel |
| J | Andean Trade Preference Act (ATPA). This program expired on July 31, 2013. | ATPA |
| J- | Andean Trade Promotion and Drug Eradication Act (ATPDEA). This program expired on July 31, 2013. | ATPA |
| JO | Jordan Special Rate | Jordan |
| K | Agreement on Trade in Pharmaceutical Products (duty-free treatment). | NTR (MFN) |
| KR | Korea Special Rate | Korea |
| L | Uruguay Round Concessions on Intermediate Chemicals for Dyes (duty-free treatment) | NTR (MFN) |
| MA | Morocco Special Rate | Morocco |
| MX | NAFTA for Mexico | Mexico |
| OM | Oman Special Rate | Oman |
| P | Dominican Republic- Central America Free Trade Agreement (DR-CAFTA) | CAFTA + Dom. Rep. |
| P+ | Dominican Republic- Central America Free Trade Agreement Plus (DR-CAFTA Plus) | CAFTA + Dom. Rep. |
| PA | Panama Special Rate | Panama |

| Preferential (duty-free or reduced rate) tariff program applicability to this HTS item | |
|---|---|
| GSP (Generalized System of Preferences) | Status | Eligible: code "A" |
| | Countries Excluded from GSP eligibility on this item | |
| Civil Aircraft Agreement Preference | | Eligible: code "C" |
| Tariff concession on Dyes | | Not eligible |
| CBI or CHERA (Caribbean Basin Initiative) Preference | Status | Eligible: code "E" |
| | Ad Valorem Rate | 0% |
| | Specific Rate | $0 |
| AGOA (African Growth and Opportunity Act) | | Not Eligible |
| CBTPA (Caribbean Basin Trade Partnership Act) | Status | Not Eligible |
| | Ad Valorem Rate | |
| | Specific Rate | |
| Morocco FTA Preference | Status | Eligible code: "MA" |
| | Ad Valorem Rate | 0% |
| | Specific Rate | $0 |
| | Other Rate | $0 |
| Jordan FTA Preference | Status | Eligible code: "JO" |
| | Ad Valorem Rate | 0% |
| | Specific Rate | $0 |
| | Other Rate | $0 |
| Singapore FTA Preference | Status | Eligible code: "SG" |
| | Ad Valorem Rate | 0% |
| | Specific Rate | $0 |
| | Other Rate | $0 |
| Chile FTA Preference | Status | Eligible code: "CL" |
| | Ad Valorem Rate | 0% |
| | Specific Rate | $0 |
| | Other Rate | $0 |

Fig. 10A

| Preferential (duty-free or reduced rate) tariff program applicability to this HTS item | |
|---|---|
| GSP (Generalized System of Preferences) | Status | Not eligible |
| | Countries Excluded from GSP eligibility on this item | |
| Civil Aircraft Agreement Preference | | Not eligible |
| Tariff concession on Dyes | | Not eligible |
| CBI or CHERA (Caribbean Basin Initiative) Preference | Status | Not eligible |
| | Ad Valorem Rate | |
| | Specific Rate | |
| AGOA (African Growth and Opportunity Act) | | Not Eligible |
| CBTPA (Caribbean Basin Trade Partnership Act) | Status | Not Eligible |
| | Ad Valorem Rate | |
| | Specific Rate | |
| Morocco FTA Preference | Status | Not Eligible |
| | Ad Valorem Rate | |
| | Specific Rate | |
| | Other Rate | |
| Jordan FTA Preference | Status | Not Eligible |
| | Ad Valorem Rate | |
| | Specific Rate | |
| | Other Rate | |
| Singapore FTA Preference | Status | Not Eligible |
| | Ad Valorem Rate | |
| | Specific Rate | |
| | Other Rate | |
| Chile FTA Preference | Status | Not Eligible |
| | Ad Valorem Rate | |
| | Specific Rate | |
| | Other Rate | |

Fig. 10B

Ancillary Data - Preferential Treatment Agreements —1100

| Agreement | Coverage | Applied preferential tariff |
|---|---|---|
| ASEAN FTA (AFTA) (in force since 2002) | All products, except for those in 10 tariff lines considered sensitive products; | |
| | 80% of tariff lines covered; | Zero (as from 2007) |
| | Tariff rates on remaining items will be reduced to zero in 2010 (except for sensitive products) | Zero (as from 2010) |
| ASEAN-China FTA Trade in Goods Agreement (into force on 1 July 2005) | 4,775 tariff lines (normal track) | Zero (by 2010, been reduced since 1 July 2005) |
| | 252 tariff lines (sensitive products) | 20% in year 2012 and 5% as from year 2018 |
| ASEAN-China FTA Early Harvest Programme | All vegetable and fruit products under HS Chapters 7 and 8 | Zero (as from 1 October 2003) |
| | Products in HS Chapter 1 to 8 | Zero (as from 1 January 2006) |
| Framework Agreement between Thailand and Bahrain | 419 items | Zero |
| | 207 items | 3% |
| Thailand - Australia FTA (TAFTA) | 2,724 tariff lines | Zero (as from 1 January 2005) |
| | Remaining items | Zero (by 2010) |
| Thailand - New Zealand FTA (in force on 1 July 2005) | Most products | Zero (by 2010) |
| | Sensitive items | Zero (by 2015) |
| | Upon full implementation, approximately 50% of imports from New Zealand should be duty free | |
| Thailand - India FTA Early Harvest programme | 82 products | Zero (as from 1 September 2006, tariff reduction started on 1 September 2004) |
| | Remaining products in the process of negotiations | |
| Global System of Trade Preferences (GSTP) | 1,600 items to the 48 members of the GSTP Agreement | Preferential margins of 2.5% to 100% of MFN rates |
| | (Thailand's commitment on 11 items) | (Thailand's commitment: 10% tariff cut) |

Fig. 11A

Ancillary Data - Licensing —1110

| COMMODITY | HS CODE | RATIONALE | MEASURES AND CONDITION |
|---|---|---|---|
| KEROSENE | 2710.002 | MONITORING CURRENT FUEL PRICE | AUTOMATIC LICENSING, ONLY FOR AUTHORIZED IMPORTERS |
| HIGH SPEED DIESEL OIL | 2710.003 | MONITORING CURRENT FUEL PRICE | AUTOMATIC LICENSING, ONLY FOR AUTHORIZED IMPORTERS |
| CLENBUTEROL | 2922.199 | PUBLIC HEALTH | NAL: IMPORT IS PERMITTED WITH APPROVAL OF THE FOOD AND DRUG ADMINISTRATION |
| CAFFEINE | 2939.30, 3003.40 | PUBLIC HEALTH, SOCIAL SECURITY | RESTRICTION, ALLOWED ONLY WITH CERTIFICATE FROM THE FDA, OR OTHER AUTHORITY CONCERNED |
| WASTE AND SCRAP OF PLASTICS | 3915 | ENVIRONMENTAL AND PUBLIC HEALTH | NAL: WITH APPROVAL OF THE DEPARTMENT OF INDUSTRIAL WORKS |
| WOOD SAWN OR CHIPPED | 4403, 4407 – 4421 | TO FACILITATE INTERNATIONAL TRADE TRANSACTION | AUTOMATIC LICENSING, CERTIFICATE OF ORIGIN, EXPORT CERTIFICATE FROM EXPORTING COUNTRY |
| JUTE | 5303.10, 5303.90, 5305.91, 5305.99 | TO SECURE FARMERS' INCOME | NAL: IMPORTS PERMITTED FOR USE AS RAW MATERIAL IN MANUFACTURING |
| GARMENTS | 61.01 TO 61.14 61.17.90, 62.01-62.11, 62.17.90 | COMPLIANCE WITH ATC COMMITMENT UNTIL ITS EXPIRY IN 2004 | AUTOMATIC LICENSING |
| SACKS AND BAGS OF JUTE OR OTHER TEXTILE | 6305.10, 6305.90 | TO SECURE FARMERS' INCOME | IMPORT NOT GENERALLY ALLOWED, PERMITTED ONLY AS RAW MATERIAL IN MANUFACTURING |
| WORKED MONUMENTAL OR BUILDING STONE | 6802 | INDUSTRY PROTECTION | NAL: IMPORT NOT GENERALLY ALLOWED |
| USED MOTORCYCLE ENGINES | 8407.31, 8714.19, 72.04, 76.02 | PUBLIC HEALTH AND SAFETY | ABSOLUTELY PROHIBITED |
| USED DIESEL ENGINES WITH DISPLACEMENT OF 331-1,110CC. | 8408.90 | PUBLIC HEALTH AND SAFETY | NAL: IMPORT NOT GENERALLY ALLOWED |
| INTAGLIO PRINTING MACHINERY | 8443.500 | TO PREVENT MAKING OF COUNTERFEIT MONEY | AUTOMATIC LICENSING |
| CHAIN SAWS | 8467.81, 8467.91, 8508.20, 8508.90 | TO PREVENT SMUGGLING OF LOGGING, FOREST CONSERVATION | DEPARTMENT OF FOREIGN TRADE AUTHORIZES THE DEPARTMENT OF FORESTRY TO GRANT IMPORT PERMITS |
| PASSENGER CARS (PROTOTYPE) | 8702.101, 8702.901 | INDUSTRY PROTECTION, FOREIGN CURRENCY RESERVATION | IMPORT NOT GENERALLY ALLOWED, EXCEPT AS PROTOTYPE FOR ASSEMBLY OR PRODUCTION |
| USED MOTOR VEHICLES | 8703.21, 8703.229, 8703.239, 8703.249, 8703.319, 8703.329, 8703.339 | PUBLIC HEALTH, ENVIRONMENTAL PROTECTION | NAL: IMPORT NOT GENERALLY ALLOWED, EXCEPT FOR IMPORTS FOR RE-EXPORT OR IMPORT BY INDIVIDUAL |
| MOTOR VEHICLES FOR THE TRANSPORT OF 30 OR MORE PERSONS | 8702.101, 8702.901 | INDUSTRY PROTECTION, FOREIGN CURRENCY RESERVATION | NAL: IMPORT NOT GENERALLY ALLOWED, EXCEPT AS PROTOTYPE FOR ASSEMBLY OR PRODUCTION |

Fig. 11B

PREDICTIVE COMMODITY CLASSIFICATION

CROSS-REFERENCE TO RELATED APPLICATIONS

This application, having attorney docket number IPP2018010233/UPSE.292122 and entitled "Predictive Commodity Classification," claims priority to U.S. Provisional Application 62/484,159, filed Apr. 11, 2017, entitled "Predictive Commodity Classification." The entirety of the aforementioned application is incorporated by reference herein.

BACKGROUND OF THE INVENTION

Importing shipments is a complicated process involving many regulations that vary from country to country. For example, many countries restrict the type of goods that can be imported under the auspices of international trade agreements or unilateral regulation by the importing country. Moreover, special permits may be required for importing particular goods to a particular consignee. Finally, each country has different documentation requirements that must be met, which are typically based on the type of good being imported (e.g., machine products, textiles, agricultural goods, and/or the like).

Often, an importer is responsible for clearing the shipment through a customs authority and bears the legal responsibility to ensure the correct classifications are applied. Incorrect classifications of an international shipment can lead to significant and costly consequences, such as delays in clearing the goods, overpayment of duties, penalties, and/or the like. Therefore, a need exists for systems and methods that allow carriers to leverage logistics networks to proactively assist importers in managing the clearance of shipments/items to facilitate a more efficient delivery.

BRIEF DESCRIPTION OF THE SEVERAL VIEWS OF THE DRAWING

Figure 1:
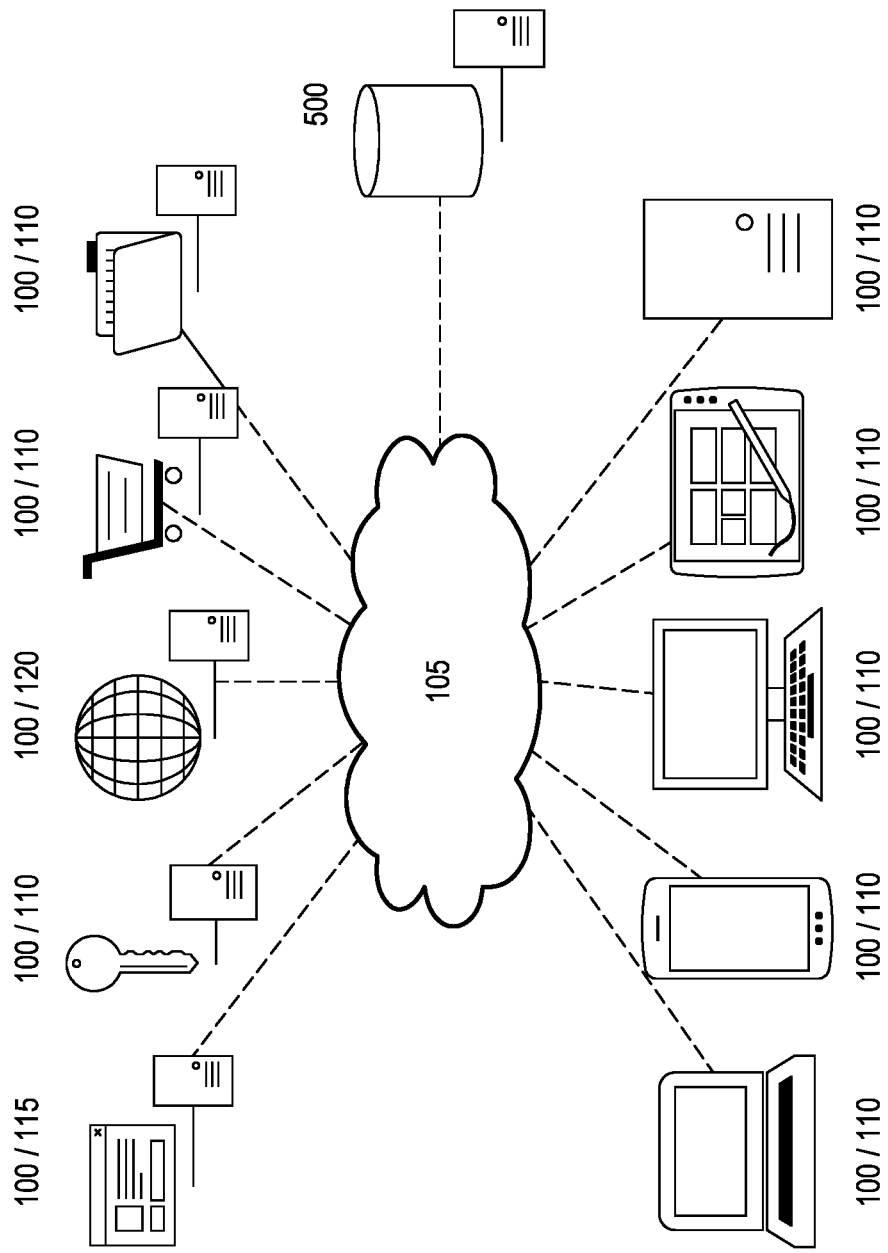
Figure 2:
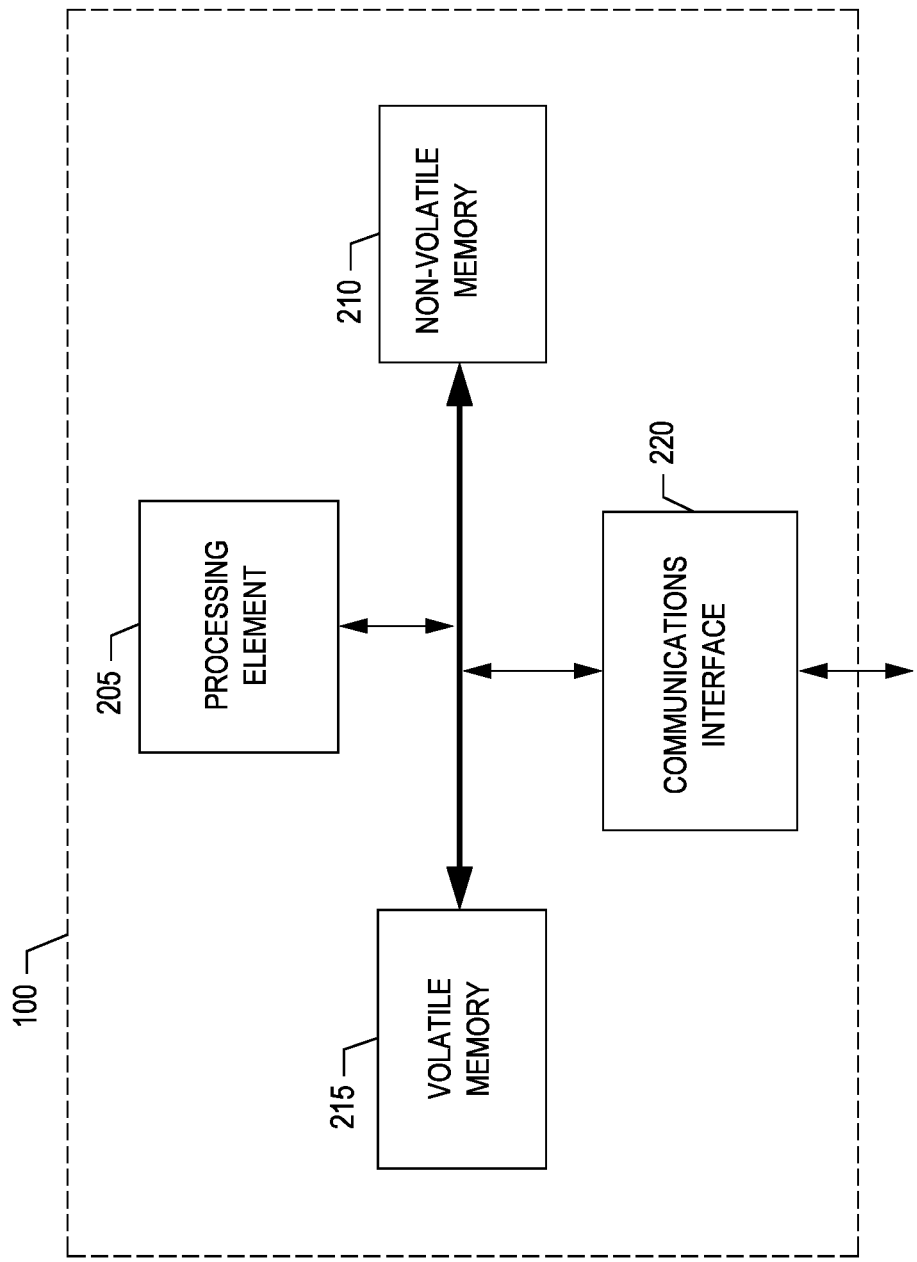
Figure 3:
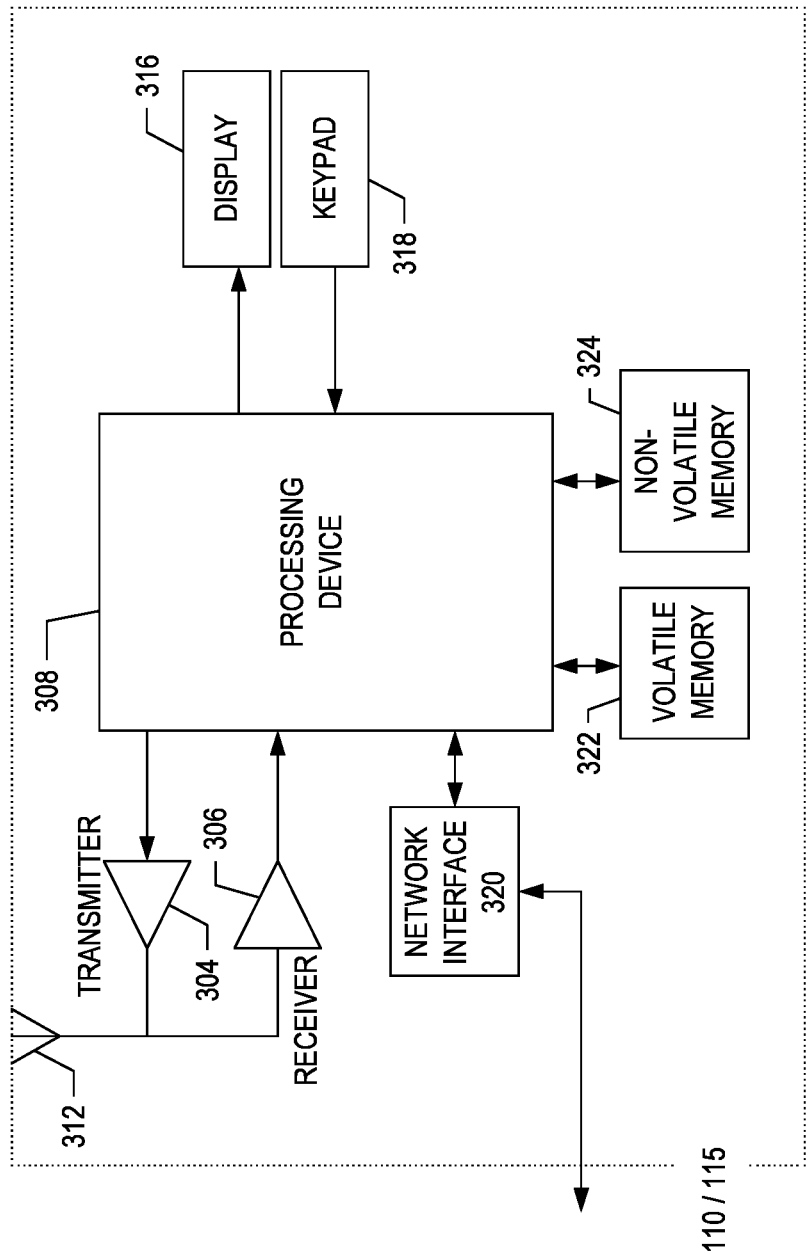
Figure 4:
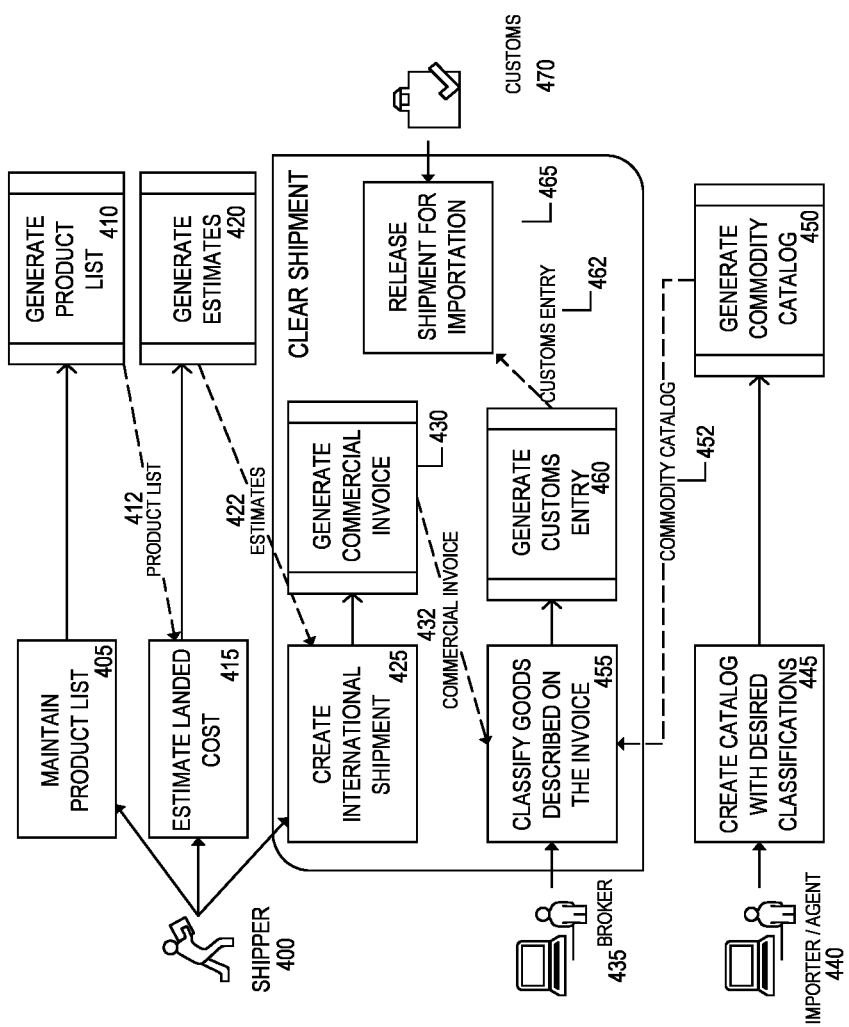
Figure 5:
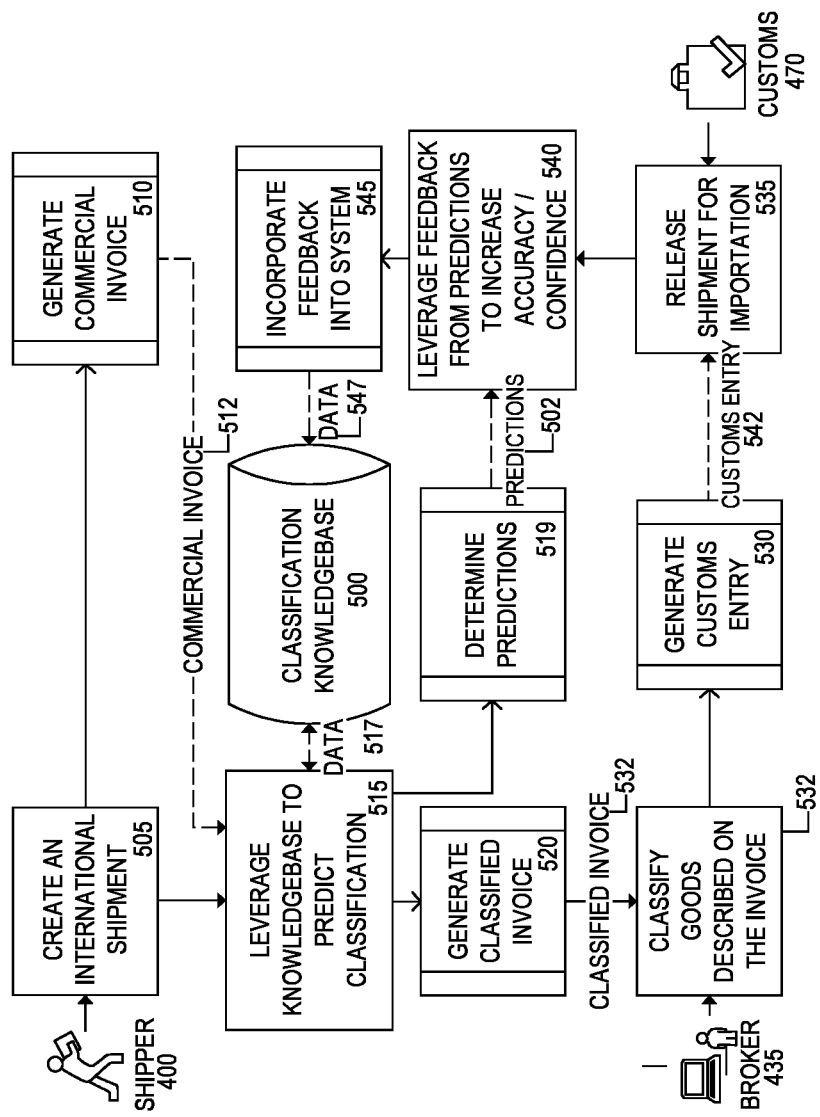
Figure 6:
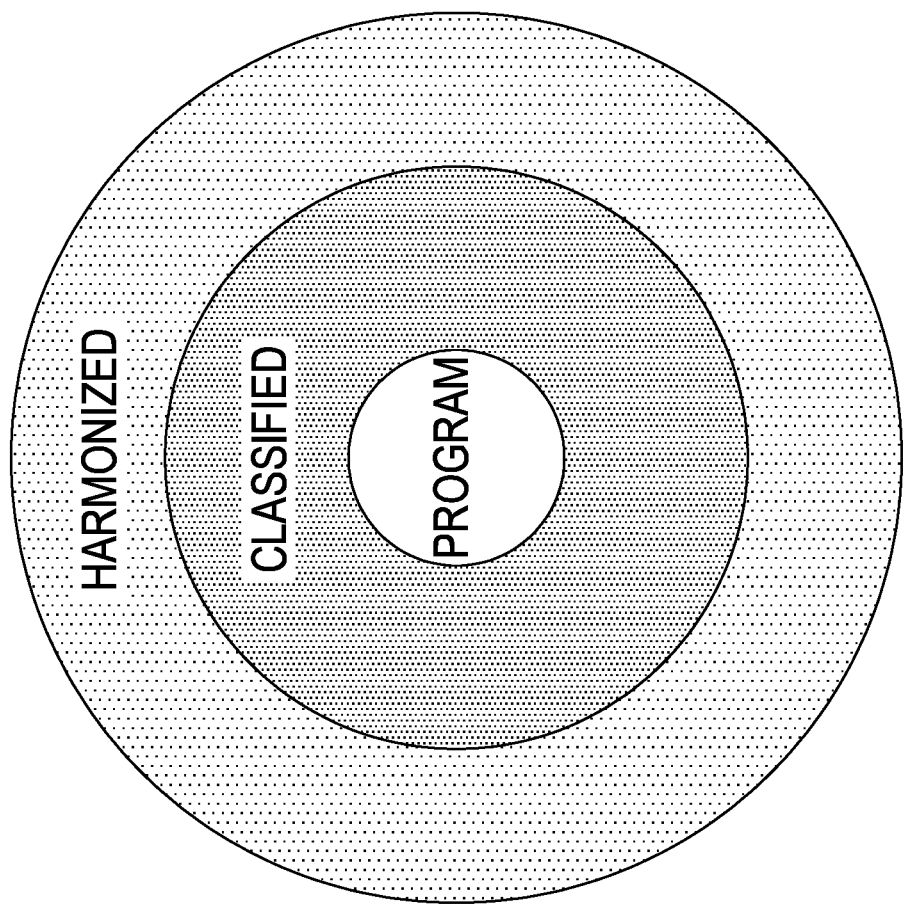
Figure 12:
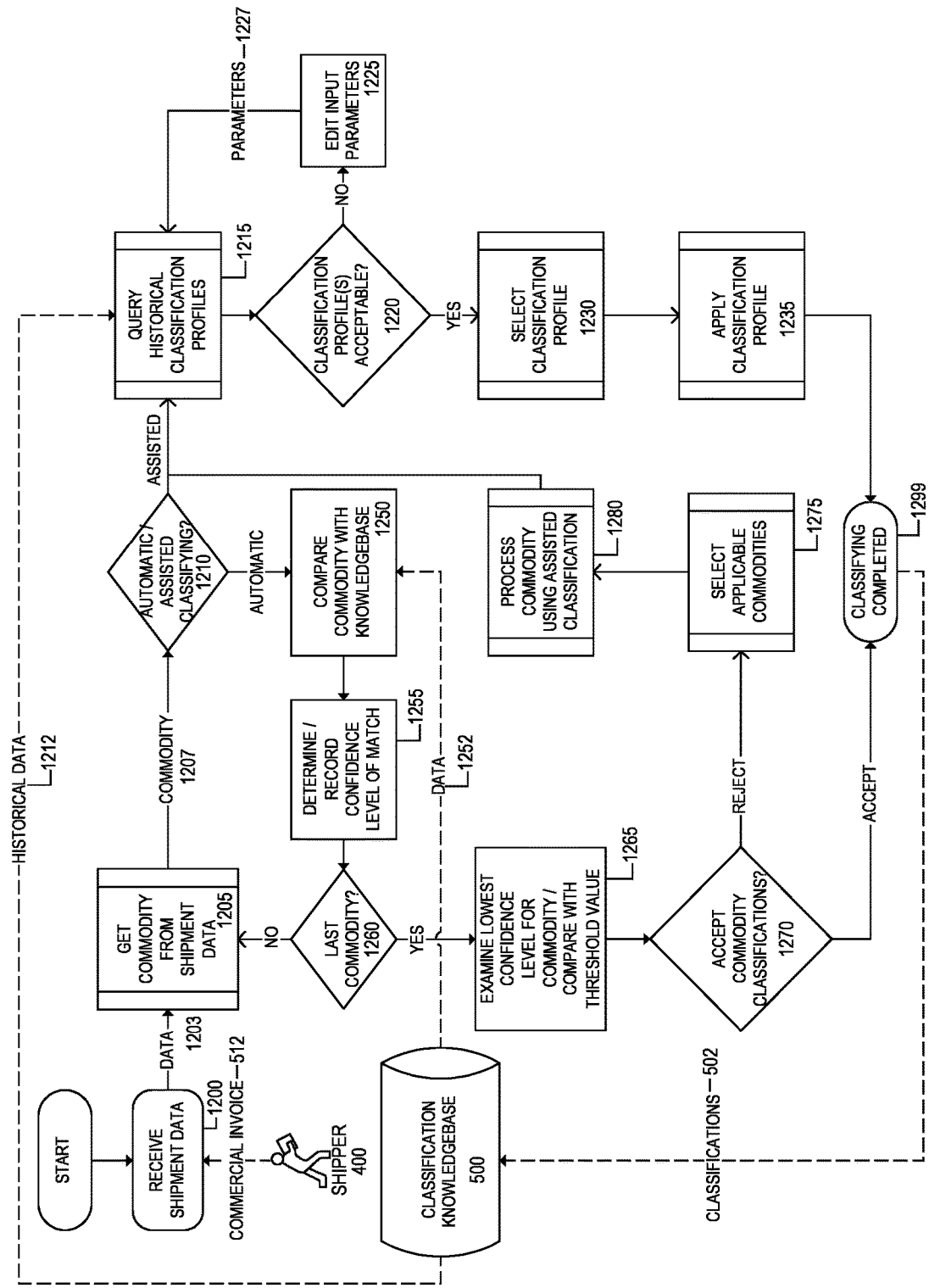
Figure 13:
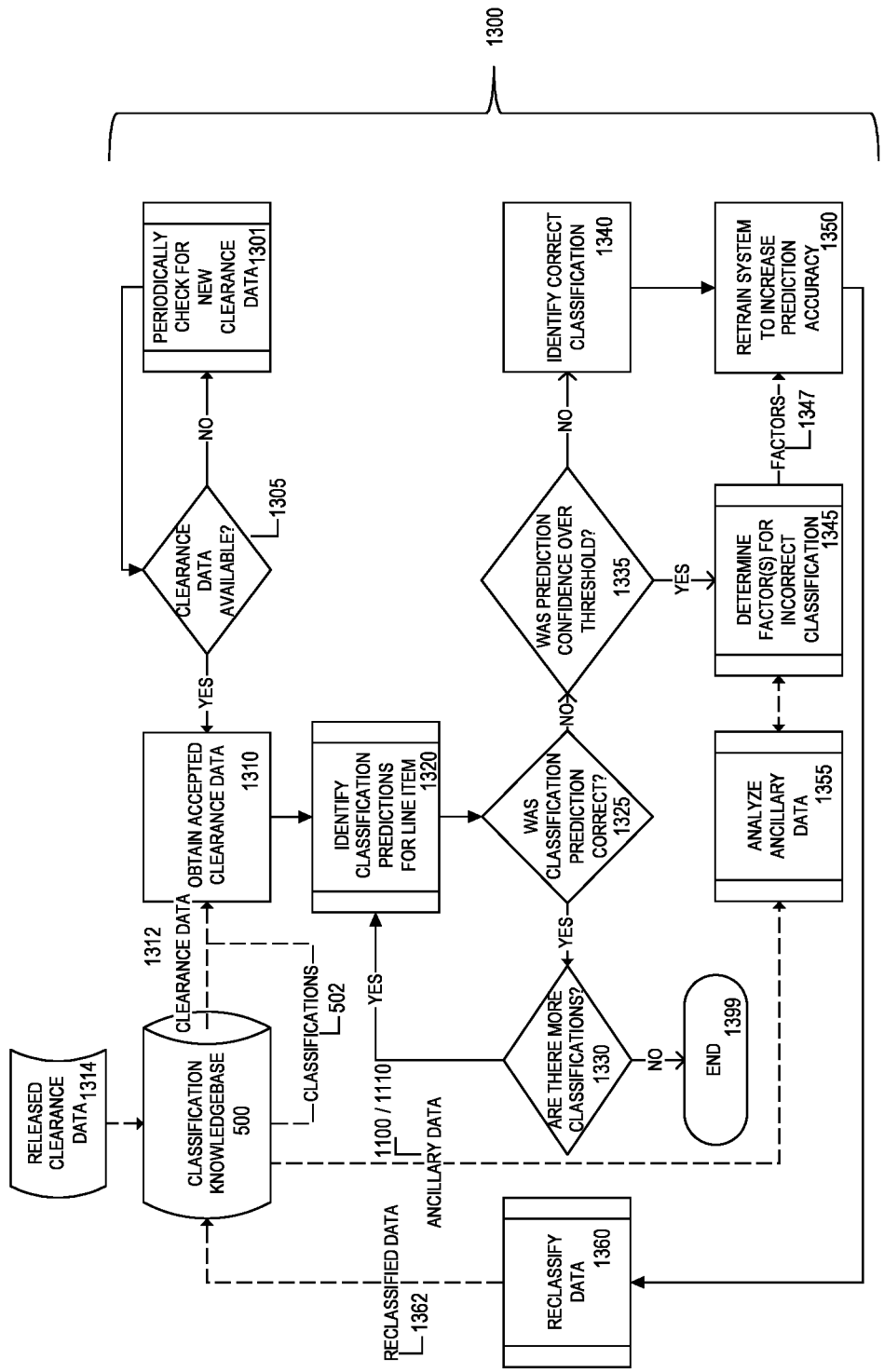

Having thus described the invention in general terms, reference will now be made to the accompanying drawings, which are not necessarily drawn to scale, and wherein:

FIG. 1 is an exemplary schematic diagram of a system that may be used to practice various embodiments of the present invention;

FIG. 2 is an exemplary schematic diagram of a classification prediction system in accordance with certain embodiments of the present invention;

FIG. 3 is an exemplary schematic diagram of a user computing entity in accordance with certain embodiments of the present invention;

FIG. 4 is an exemplary flow diagram for clearing a shipment through a customs authority;

FIG. 5 is an exemplary flow diagram for incorporating a prediction feedback system to classifying a commodity in accordance with various embodiments of the present invention;

FIG. 6 is a representation of certain commodity classification profiles that may be predicted by the classification prediction system in accordance with various embodiments of the present invention;

FIGS. 7A, 7B, 8A, 8B, 9, 10A, 10B, 11A, and 11B are tables illustrating the types of information/data that may be collected and/or determined by a classification prediction system in accordance with various embodiments of the present invention;

FIG. 12 is an exemplary flow diagram for classifying a commodity in accordance with one embodiment of the present invention; and FIG. 13 is an exemplary flow diagram illustrating tasks that may be performed in accordance with various embodiments of the present invention.

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

I. Computer Program Products, Methods, and Computing Entities

Embodiments of the present invention may be implemented in various ways, including as computer program products that comprise articles of manufacture. Such computer program products may include one or more software components including, for example, software objects, methods, information/data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other information/data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more classification prediction systems 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Exemplary Classification Prediction System

FIG. 2 provides a schematic of a classification prediction system 100 according to one embodiment of the present invention. In general, the terms server, computing entity, computer, entity, device, system, and/or similar words used herein interchangeably may refer to, for example, one or more computers, computing entities, desktop computers, mobile phones, tablets, phablets, notebooks, laptops, distributed systems, dongles, items/devices, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the classification prediction system 100 may also include one or more communications interfaces 220 for communicating with various computing entities, such as by communicating data, content, information, and/or similar terms used herein interchangeably that can be transmitted, received, operated on, processed, displayed, stored, and/or the like.

The classification prediction system 100 can be operated by various entities, including carriers. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, and/or the like), and/or the like. However, a carrier may also be a nontraditional carrier, such as Amazon, Google, Uber, ride-sharing services, crowd-sourcing services, retailers, and/or the like. As shown in FIG. 2, in one embodiment, the classification prediction system 100 may include or be in communication with one or more processing elements 205 (also referred to as processors, processing circuitry, processing device, and/or similar terms used herein interchangeably) that communicate with other elements within the classification prediction system 100 via a bus, for example. As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the classification prediction system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In one embodiment, the classification prediction system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the classification prediction system 100 with the assistance of the processing element 205 and operating system.

As indicated, in one embodiment, the classification prediction system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the classification prediction system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced information/data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR)

protocols, near field communication (NFC) protocols, Wibree, Bluetooth protocols, wireless universal serial bus (USB) protocols, and/or any other wireless protocol.

Although not shown, the classification prediction system 100 may include or be in communication with one or more input elements, such as a keyboard input, a mouse input, a touch screen/display input, motion input, movement input, audio input, pointing device input, joystick input, keypad input, and/or the like. The classification prediction system 100 may also include or be in communication with one or more output elements (not shown), such as audio output, video output, screen/display output, motion output, movement output, and/or the like.

As will be appreciated, one or more of the classification prediction system's 100 components may be located remotely from other classification prediction system 100 components, such as in a distributed system. Furthermore, one or more of the components may be combined and additional components performing functions described herein may be included in the classification prediction system 100. Thus, the classification prediction system 100 can be adapted to accommodate a variety of needs and circumstances. As will be recognized, these architectures and descriptions are provided for exemplary purposes only and are not limiting to the various embodiments.

Exemplary User Computing Entity

A user may be an individual, a family, a company, an organization, an entity, a department within an organization, a representative of an organization and/or person, and/or the like. To do so, a user may operate a user computing entity 110 that includes one or more components that are functionally similar to those of the classification prediction system 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this manner, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the classification prediction system 100. In a particular embodiment, the user computing entity 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the classification prediction system 100 via a network interface 320.

Via these communication standards and protocols, the user computing entity 110 can communicate with various other entities using concepts such as Unstructured Supplementary Service information/data (US SD), Short Message Service (SMS), Multimedia Messaging Service (MIMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the user computing entity 110 to interact with and/or cause display of information/data from the classification prediction system 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the classification prediction system 100 and/or various other computing entities.

In another embodiment, the user computing entity 110 may include one or more components or functionality that are the same or similar to those of the classification prediction system 100, as described in greater detail above. As will be recognized, these architectures and descriptions are provided for exemplary purposes only and are not limiting to the various embodiments.

Exemplary User Import Information/Data Server

Various embodiments may include a user import information/data server that provides user import information/data (e.g., company policies and procedures, shipper/consignee, importer, account information, customer product catalogs, and/or the like) The components of the user import information/data server 115 may include one or more components that are functionally similar to those of the classification prediction system 100 the user computing entity 110. For example, in one embodiment, each user import information/data server may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments.

Exemplary Tariff Management Server

Various embodiments may include a tariff management server 120 that provides the required brokerage information/data for clearing a shipment (e.g., government/private sector published tariffs, third party information/data repositories, and/or the like). The components of the tariff management server 120 may include one or more components that are functionally similar to those of the classification prediction system 100. For example, in one embodiment, the tariff management server 120 may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments.

Exemplary Commodity/Good

As will be recognized, the term "goods" may be referred to herein interchangeably as item, good, package, shipment, parcel, commodity, and/or the like. A commodity/good can be considered as any item that is being imported into a country or out of a country as part of a shipment. Commodities/Goods can be of any type and nature, ranging from agricultural products to industrial goods. In one embodiment, a good may be or be enclosed in one or more packages, envelopes, parcels, bags, containers, loads, crates, items banded together, vehicle parts, pallets, drums, the like, and/or similar words used herein interchangeably. Such items may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes.

Exemplary Classification/Rating

As will be recognized, the term "rating" may be referred to herein interchangeably as classification, clearance, and/or the like. In order to import a shipment into a country, several regulatory requirements must be met prior to the local country's customs officials clearing the shipment for entry. The requirements to clear a shipment (e.g., obtain clearance from the governmental Customs Office) vary from country to country, but frequently follow similar principles. Until clearance is obtained, the shipment cannot be delivered and must remain in storage, usually in a restricted access warehouse near the point of entry. Thus, it is desirable to rapidly and timely obtain customs clearance so shipments may be delivered with minimum delay and storage.

The customs clearance usually requires payment of certain fees. The type of fees vary according to each country and are known as government imposed value-added taxes, fees, import duties, and/or the like (collectively referred to hereinafter as duties and tariffs). The amount is frequently based on the type of goods, their value, and quantity imported. The values of certain fees can also depend on associated transportation costs. Nevertheless, these fees do not include the costs of shipping the goods by the carrier. In many cases, the shipper will reimburse the carrier for paying the fees to the regulatory entities on behalf of the shipper.

The process of determining the total cost associated with the importation of a good (excluding transportation costs) is referred to as 'rating' and/or 'classifying.' Usually, the shipper (the entity originating the shipment) or the consignee (entity receiving the shipment) relies on the common carrier or other third party to rate the shipment. Because the rules for determining duties and tariffs vary from country to country, classifying a shipment is complicated. Further, the rules governing the fees are subject to change, resulting in occasional changes in fee structures. For example, a country may decide to increase duties for importing goods exported from a specific exporting country as a political response to the specific exporting country's actions. Consequently, the autonomous determination of fees associated with shipment is a sophisticated technical problem for which one embodiment of the present invention provides a solution.

Moreover, rating/classifying is based on a "Declaration" indicating the goods shipped. The Declaration (also referred to herein interchangeably as the "commercial invoice") includes, among other information, the quantity of items, their description, part number, value, and/or the like. The items may be further decomposed into 'commodities' correlating with internationally recognized commodities for customs processing and which are identified by tariff codes. For example, an imported wristwatch may be listed as commodities comprising a watchband, case, and watch mechanism. The Declaration provided by the originator may detail the commodities and associated tariff codes, and if provided, this simplifies customs processing. This significantly complicates rating as the carrier and/or customs broker must determine the appropriate commodities and tariff codes for the identified goods.

Exemplary Classification/Rating Profile

At a high level, classifying a commodity involves accessing shipping information/data associated with the same exporter, the same importer, or both. Shipping information/data containing descriptions and/or part numbers are stored along with the corresponding tariff code that was determined in some manner. The information/data associated with a given commodity is called a "classification profile" or "rating profile." A classification profile may contain the account associated with the exporter, importer, or both; the date the profile was created; the original invoice line description; the original part number; and the source of the profile (how it was created). Each commodity may contain a description, tariff code, tariff treatment, tariff classification, procedure identification, preference identification, supplementary codes, excise duties, and/or the like. Further information/data in the rating profile may be included regarding regulatory aspects required for clearance, such as other governmental agency clearances required for importation.

Further, according to various embodiments, a classification profile may be established for an imported good that is linked to other commodity classification profiles. This is useful when the imported good is an assembly of commodities that is classified according to each sub-component. For example, a classification profile may be established for a particular manufacturer's watch that is identified by a particular watch model number, part number, or descriptive name. This individual classification profile may be associated with several other individual rating profiles. In the example of a wristwatch, the classification profile for the wristwatch may be linked to a classification profile for the wristband, a separate classification profile for the timepiece, and a separate classification profile for the case. Further, if the same watch manufacturer exports a second type of wristwatch, a separate classification profile may exist. This second classification profile may be linked with the same classification profiles for the wristband and the timepiece, but may be linked to a different classification profile for the case. This accommodates assemblies of components where one commodity of the assembly is slightly different, thus impacting the value and associated tariff. This would occur if the wristwatch manufacturer sells wristwatches of different values based on the type of case. (e.g., a steel watch case versus a gold watch case).

Exemplary Networks

In one embodiment, any two or more of the illustrative components of the architecture of FIG. 1 may be configured to communicate with one another via respective communicative couplings to one or more networks 105. The networks 105 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 may have any suitable communication range associated therewith and may include, for example, global networks (e.g., the Internet), metropolitan area networks (MANs), wide area networks (WANs), local area networks (LANs), or personal area networks. In addition, the networks 105 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary System Operation

Reference will now be made to FIGS. 4, 5, 6, 7A, 7B, 8A, 8B, 9, 10A, 10B, 11A, 11B, 12, 13, and Appendix A. FIGS. 4-5, and 12-13 are flow diagrams illustrating operations, steps, and processes that may be performed for classifying a commodity and/or incorporating a prediction feedback system.

Brief Overview

As will be recognized, embodiments of the present invention facilitates the process of importing goods into a country. In order to import a shipment into a country, several regulatory requirements must be met prior to the local country's customs officials clearing the shipment for local delivery. The requirements to clear a shipment (e.g., obtain clearance from the governmental Customs Office) vary from country to country, but frequently follows similar principles. Until clearance is obtained, the shipment cannot be delivered and must remain in storage, usually in a restricted access warehouse near the point of entry. As such, it is desirable to rapidly and timely obtain customs clearance so that shipment may be delivered with maximum accuracy, and minimum delay and/or storage.

To facilitate the import process, most countries have adopted an international goods classification scheme for categorizing goods. In various embodiments, the prediction classification system 100 may index and/or structure information/data according to this classification scheme in a classification knowledgebase 500. The scheme provides a classification number along with a description of the goods. The importing country assigns a duty rate based on the classification of the goods. Thus, the duty rate in conjunction with the value of the goods (and other factors) allows calculation of the duties and taxes to be paid to customs for the imported goods.

Described herein are embodiments for a completely new approach for classifying a commodity corresponding to a shipment that may leverage predictive feedback for the same and/or related brokerage transactions. For example, a prediction classification system 100 (also referred to herein as classification prediction system 100) may be configured to predict/determine/identify/classify the chapter, heading, and subheading for a commodity in accordance with the Harmonized Tariff Schedule (HTS); predict/determine/identify/classify commodity to the specific tariff code for the import country; and/or predict/determine/identify/classify the applicable special treatment program of international commodities for the purpose of importation—each and all of which may be referred to individually and generally as a classification. Further, the prediction classification system 100 may also be capable of dynamically and/or continuously updating relevant information/data continuously to the prediction feedback system 1300. As such, the system can reliably leverage up-to-date information/data to assist in fully predicting proper classifications 502 for any given commodity before releasing the shipment to customs for clearance.

In the described embodiments, a prediction classification system 100 implements machine learning techniques to classify commodities based in part on a continuous prediction feedback system 1300. As will be recognized, the machine learning algorithms are trained to predict commodity classifications by leveraging a classification knowledgebase 500 to determine the predictions, each of which may correspond to a particular confidence level. Once the prediction classification system 100 classifies a commodity in accordance with various embodiments described herein, the system 100 may provide an option for a user (a) to accept the proposed classifications and initiate a shipment clearance request or (b) to reject and/or review the proposed classifications, thereby introducing a final review/confirmation process. In certain embodiments, the prediction classification system 100 is capable of presenting user-elected options to enable fully-automated classifications, partially-automated (e.g., "assisted") classifications, manual classifications, and/or any combination thereof In various embodiments, the prediction classification system 100 may further leverage the prediction feedback system 1300 to record and/or analyze released information/data shipment information/data information/data corresponding to historical brokerage transactions, which may be collected and/or aggregated and stored in classification knowledgebase 500 to "learn" from feedback from customs agencies or company resources to apply to future transactions (e.g., shipments/commodities). As will be recognized, the prediction classification system 100 may analyze and/or learn from any of the aforementioned methods in the prediction feedback system 1300.

Data Collection/Aggregation

In various embodiments, information/data from multiple sources (e.g., user import information/data server 115, tariff management server 120, historical brokerage transactions, or any combination thereof, as well as a variety of third party information/data repositories and computing systems provided by import providers or other entities) may need to be collected and/or aggregated.

In one embodiment, this information/data may be collected and/or aggregated into a common repository, also referred to herein as the classification knowledgebase 500. Further, the prediction classification system 100 may index and/or structure the information/data according to a classification scheme in the classification knowledgebase 500. For example, the prediction classification system 100 may transform into their corresponding commodities correlating with internationally recognized commodities for customs processing and which are identified by tariff codes.

In an embodiment, the prediction classification system 100 may not initially assign any preferences to or ranking/priority of the information/data sources. As will be recognized, the prediction classification system 100 may subsequently determine and/or apply a ranking/priority of the information/data sources. This may occur as the feedback prediction system 1300 correlates confidence levels with the input information/data sources.

As will be recognized, the prediction classification system 100 and the feedback prediction system 1300 may interact with information/data (e.g., create, read, update, and/or delete) from the classification knowledgebase 500 at various stages of the clearance process of a shipment. In this manner, the knowledgebase 500 may record metadata (e.g., timestamps, country of origin, country of importation, and/or the like) associated with the information/data points to determine if they are new instances of the information/data. Further, the prediction classification system 100 may recognize such scenarios and subsequently provide input to the confidence level of a prediction.

Exemplary Clearance Process

Phase 1 of FIG. 4: Facilitating International Shipment

FIG. 4 is an exemplary flow diagram of a process for clearing a shipment through a customs authority. While facilitating an international shipment, the shipper 400 may have to perform additional tasks before tendering the shipment to the carrier. It is a desirable for the shipper 400 to estimate the landed costs of goods prior to shipping. This is an advantageous process generally done by the shipper 400 to reduce the likelihood that the importer may reject the goods due to an unexpectedly high costs associated with the import of the goods.

Step/Operation 405 of FIG. 4: Maintain Product List

As illustrated in FIG. 4, the shipper (or a 3rd party servicer) 400 initiates the process by maintaining a product list. In various embodiments, the product list 412 can be generated by a set of international tools provided by a carrier that are accessible to the shipper 400 to assist the shipper 400 in harmonizing his or her goods.

In various embodiments, the product list 412 generally comprises the manufacturer's particular model number, part number, and part description. The product list 412 may be structurally similar to the commodity catalog 452, with the exception that it is created and maintained by the shipper 400. Moreover the product list 412 may differ from the commodity catalog 452 in that it is generally contains less information/data, often containing only enough to estimate the government fees associated to the importation.

Step/Operation 410 of FIG. 4: Generate and/or Present Product List

As noted, the shipper 400 may generate the product list 412, for example, by utilizing international tools provided by a carrier. The shipper 400 may manually compile the list and utilize it to continue the facilitation of his or her international shipment. Alternatively, the shipper 400 may transmit the contents of the product list 412 to the prediction classification system 100 across network 105.

Step/Operation 415 of FIG. 4: Estimate Landed Cost

The cost of importing goods is often referred to as the 'landed cost' of a shipment. This involves the total cost of delivering the goods from origination (shipper) to destination (consignee) and comprises transportation (shipping) costs and various duties and taxes. The transportation costs are associated with transferring, loading, and unloading the goods along the route (frequently involving costs associated with air or marine transportation, portage, short term storage, transfers, local shipping, and/or the like). The other major components of landed cost are the regulatory costs of duties and taxes that are dependent on the destination country. These costs may include various value added taxes (VAT), import duties, custom (tariff) charges, and surcharges assessed based on the type and value of good. For example, a raw product and a processed product of the same basic material (e.g., spooled wool fiber versus woven wool fabric) are taxed and tariffed differently. Alternatively, a single consumer product, such as a wrist watch, may be tariffed and taxed as multiple commodity items/goods, e.g., a watch band, watch works, and watch case. As expected, taxes for a jeweled, gold-metal watch case are less than taxes for a plain, steel-metal watch case.

As noted, a carrier may provide a set of international tools that assists the shipper 400 in estimating the landed cost. Advantageously, the shipper 400 may utilize these tools and store the goods that they frequently ship in the product list 412 to facilitate landed costs requests.

Step/Operation 420/425 of FIG. 4: Generate Estimates to Create an International Shipment In one embodiment, upon providing the appropriate information/data to estimate landed costs, the shipper 400 may generate estimates 422 and provide them to the prediction classification system 100 to facilitate creating an international shipment, as illustrated by process 420 of FIG. 4.

Step/Operation 430 of FIG. 4: Generate Commercial Invoice

In one embodiment, the shipper 400 leverages the estimates 422, provided to prediction classification system 100 in process 425, to generate a commercial invoice 432. The commercial invoice 432 may also be referred to herein interchangeably as the "Declaration" and includes, among other information/data, the quantity of items, their description, part number, and value. Furthermore, commercial invoice 432 may include terms of sale, origin of goods, shipper, buyer, consignee, and/or the like. As previously noted, the commercial invoice 432 provided by the originator may detail the commodities and associated tariff codes, and if provided, may simplify the subsequent processes performed by prediction classification system 100. Notably, the item description provided by the shipper 400 generally does not directly comport to an international commodity description provided by the World Customs Organization (WCO). In the event the item description provided does correspond, the commercial invoice 432 may fail to include the necessary tariff codes. As such, the prediction classification system 100 would preferably contain input information/data sources in addition to the commercial invoice 432.

Phase 2 of FIG. 4: Leveraging Commercial Invoice to Classify Goods

In various embodiments, the shipment clearance process typically begins with a shipper submitting the commercial invoice 432 that defines the contents of a shipment through a customs authority 470 (also referred to herein as clearance authority 470). As illustrated in FIG. 4, the information/data may be sent to a broker 435 who leverages his or her personal expertise to further classify the shipment.

Step/Operation 445/450 of FIG. 4: Create and Generate Commodity Catalog with Desired Classifications Traditional classification systems such as the one illustrated by FIG. 4 are generally classified by a broker 435 reviewing the goods described on a commercial invoice 432 and assigning each commodity the appropriate tariff classification. This process may be optimized by cross referencing with a commodity catalog 452.

As will be recognized, an importer or agent 440 may maintain a separate catalog. In one embodiment, much of the relevant information/data needed to determine classifications may be provided to a broker 435 via the commodity catalog 452. As illustrated, the commodity catalog 452 is created/maintained in process 445, and provided to a broker 435 by process 450.

In various embodiments, the commodity catalog 452 may be a collection of goods/commodities that comprise instructions on a manner of classifying the goods for clearance. In addition, the commodity catalog 452 may comprise a listing of frequent commodities being imported. As noted, each commodity may be indexed by a part number, part description, or tariff code. Further, the catalog may contain the classification details that can be queried by the part number listed on the commercial invoice 432.

Step/Operation 455 of FIG. 4: Classify Goods Described on Invoice

As illustrated in FIG. 4 and described herein, various embodiments of the present invention include a process 455 for classifying goods described on a commercial invoice 432. In an embodiment, the broker 435 leverages personal expertise and the commodity catalog 452 to classify goods. As will be recognized, a customer catalog entry may be historically saved in the commodity catalog 452 once an entry is classified by the broker 435.

Step/Operation 460 of FIG. 4: Generate Customs Entry

In one embodiment, once the broker 435 leverages his or her personal expertise and the commodity catalog 452 to classify a good, the classification prediction system 100 may generate a customs entry 462. Generally, the customs entry 462 is a declaration made to the clearance authority 470 (e.g., customs authority) for the purpose of gaining entry or accounting for duties, taxes and/or fees.

Step/Operation 465 of FIG. 4: Release Shipment for Importation

Once the shipment has been rated (and assuming none of the items are restricted from importation), the required duties and tariffs typically must be paid to the appropriate governmental agencies, typically the Customs Office. In this regard, information/data for each good being imported typically must be detailed to the Customs Office in a document called a Declaration. The creation of the Declaration can be divided into two activities. In the first activity, the carrier may communicate information/data regarding the shipment to the broker 435. The information/data may include description of the items, values, quantities, shipper, and/or the like. In many instances, the carrier obtains this information/data from the shipper 400 when the shipment is originated. The second activity involves the broker 435 classifying each of the items (e.g., goods) in the shipment that generates the amount due for the duties and taxes. Once completed, the Declaration can be communicated to the clearance authority 470 by either party along with the amount due. Once the clearance authority 470 collects the amount due and has reviewed the customs entry 532, the clearance authority 470 may issue a "customs clearance" to the carrier indicating that delivery to the consignee may proceed. In one embodiment, if goods have arrived at an importing port or terminal, the imported goods may be temporarily stored until clearance is obtained, and then local delivery of the goods may continue. To minimize storage costs and delays, it is typically desirable to provide accurate and complete information/data to the clearance authority 470 to facilitate a timely clearance response for a shipment.

This exemplary process may be performed for classifying a commodity in schematic diagram FIG. 4 to release the shipment for importation.

In an embodiment, some importers 440 may provide instructions on the manner in which they would prefer their goods to be declared to the clearance authority 470. The manner in which the importer 440 wishes to declare their good to the clearance authority 470 can be implemented in process 465. As noted, the clearance authority 470 may be the customs agency for a country. For example, the United States authorizes the U.S. Customs and Border Protection (CBP) for clearing shipments through customs. However, many countries authorize several agencies to provide clearance for a given shipment. As such, in various embodiments, the clearance authority 470 may include the customs agency but in some other embodiments, the clearance authority 470 may include the customs agency and also additional government agencies in the import country.

Phase 1 of FIG. 5: Facilitating International Shipment

FIG. 5 will now be described in greater detail. As noted, FIG. 5 is an exemplary schematic diagram of a process for incorporating a prediction feedback system to classifying a commodity in accordance with various example embodiments of the invention.

Alternative to the process of FIG. 4, the shipper 400 may bypass the facilitation of an international shipment phase due in part to the additional components utilized by the prediction classification system 100. For example, various embodiments may incorporate the classification knowledgebase 500 to store relevant information/data for automatically predicting classifications for commodities. As will be appreciated, such components allow the prediction classification system 100 to reliably leverage up-to-date information/data to assist in fully predicting proper classifications. Moreover, this may be accomplished without the need of shipper 400 providing repetitive known transaction information/data when creating an international shipment. In addition, the role of the importer 440 (also referred to herein as importer/agent 440) in clearing the shipment may not require continuous maintenance of the commodity catalog 452, in the example embodiment of FIG. 5.

Step/Operation 505 of FIG. 5: Create International Shipment

As illustrated in FIG. 5, the shipper (or a 3rd party servicer) 400 may initiate the process by creating an international shipment. In one embodiment, upon initially providing the appropriate data to estimate landed costs to the classification knowledgebase 500, the shipper 400 may bypass generating estimates to the prediction classification system 100 to facilitate creating an international shipment.

Step/Operation 510 of FIG. 5: Generate Commercial Invoice

In one embodiment, the shipper 400 may leverage the classification knowledgebase 500 to generate a commercial invoice 512. The commercial invoice 512 may also be referred to herein interchangeably as a "Declaration" and may include, among other information/data, the quantity of items (e.g., goods), their description, part number, and value. Furthermore, the commercial invoice 512 may include terms of sale, origin of goods, shipper, buyer, consignee, and/or the like As previously noted, the commercial invoice 512 provided by the originator may detail the commodities and associated tariff codes, and if provided, may simplify the subsequent processes performed by the prediction classification system 100. Notably, the item (e.g., good) description provided by the shipper 400 may not directly comport to an international commodity description provided by the WCO. In the event the item (e.g., good) description provided does correspond to the international commodity description of the WCO, the commercial invoice 512 may fail to include the necessary tariff codes. As such, the classification knowledgebase 500 may include input information/data sources in addition to the commercial invoice 512.

Phase 2 of FIG. 5: Incorporating Knowledgebase Using Machine Learning Techniques In various embodiments, the prediction classification system 100 may implement machine learning techniques to classify commodities based in part on a continuous feedback prediction system 1300 (described in detail in FIG. 13). As will be recognized, the machine learning algorithms may be trained to predict commodity classifications by leveraging the classification knowledgebase 500 to determine the predictions, each of which are referenced to a unique record in the classification knowledgebase 500 storing an associated confidence level(s).

Step/Operation 515 of FIG. 5: Leverage Knowledgebase to Predict Classification In one embodiment, the classification prediction system 100 may leverage the classification knowledgebase 500 to predict classifications for the commodities included in the commercial invoice 512. During process 515 the classification knowledgebase 500 may transmit and receive information/data 517. In an embodiment, the information/data 517 may be transmitted/received via network 105.

Step/Operation 520 of FIG. 5: Generate Classified Invoice

In one embodiment, the prediction classification system 100 may use the predictions generated during process 515 to generate a classified invoice 532. This process will be discussed in greater detail in FIG. 6 which is a schematic representation of exemplary commodity classification profiles that may be predicted by the classification prediction system 100 in accordance with various embodiments of the invention. The classified invoice 532 is similar to the commercial invoice 512 provided by the shipper 400 with the exception that it may have substantially more information/data classified. For example, the prediction classification system 100 may be configured to assign the fully qualified import country's tariff code and the applicable special treatment program of international commodities for the purpose of importation.

Phase 3 of FIG. 5: Leveraging Classified Invoice to Classify Goods

As illustrated in FIG. 5, various embodiments of the prediction classification system 100 may generate a classified invoice 542. After the prediction classification system 100 determines the classification and their associated confidence levels, a shipment clearance process may proceed with the prediction classification system 100 leveraging the classified invoice 542 to rate the goods of the international shipment.

Step/Operation 525 of FIG. 5: Classify Goods Described on Invoice

In one embodiment, the classified invoice 542 may be sent by the prediction classification system 100 to a broker 435 which may leverage the role as a subject matter expert to review and/or further classify the shipment. This process describes an "assisted" classification. As will be recognized, any such assisted classification made by the broker 435 may be historically saved in the classification knowledgebase 500 once an entry is classified.

In another embodiment, the prediction classification system 100 may determine that the classified predictions are of an appropriate confidence level threshold to bypass further review from a subject matter expert (e.g., the broker 435) entirely. In this embodiment, the prediction classification system 100 may proceed by automatically generating a customs entry (e.g., Declaration) that defines the contents of a shipment and may submit the entry to a customs authority 470.

Step/Operation 530 of FIG. 5: Generate Customs Entry

In one embodiment, once the subject matter expert (e.g., the broker 435) receives the classified invoice 532, the expert may review and/or further classify the goods. The classification prediction system 100 may subsequently generate a customs entry 462 in process 530. In some embodiments, the customs entry 532 may be a declaration made to a clearance authority 470 (e.g., customs authority) for the purpose of gaining entry or accounting for duties, taxes and/or fees.

Phase 4/Step/Operation 535 of FIG. 5: Clear Shipment for Importation

As previously described, once the shipment has been rated (and assuming none of the items are restricted from importation), the required duties and tariffs typically must be paid to the appropriate governmental agencies, such as, for example, the Customs Office (e.g., the clearance authority 470). Information/data for each good being imported typically must be detailed to the clearance authority 470 in a document called a Declaration (also referred to herein as a customs entry, e.g., customs entry 532). The creation of the Declaration may be divided into two activities. In the first activity, the carrier may communicate information/data regarding the shipment to the broker 435. The information/data may include description of the items (e.g., goods), values, quantities, shipper, and/or the like. In many instances, the carrier may obtain this information/data from the shipper 400 in an instance in which the shipment is originated. The second activity may involve the broker 435 classifying each of the items (e.g., goods) in the shipment that generates the amount due for the duties and taxes. Once completed, the Declaration may be communicated to the clearance authority 470 by either party along with the amount due. Once the amount due is collected and the customs entry 532 has been reviewed by the clearance authority 470, the clearance authority 470 may issue a "customs clearance" to the carrier indicating that delivery to the consignee may proceed. In some embodiments, in an instance in which goods have arrived at an importing port or terminal, the imported goods may be temporarily stored until clearance is obtained, and then local delivery of the goods may continue. To minimize storage costs and delays, it is typically desirable to provide accurate and complete information/data to the clearance authority 470 to facilitate a timely clearance response for a shipment.

In an embodiment, some customer data, such as importer instructions may be collected and aggregated by the classification knowledgebase 500. The manner in which the customer information/data instructs the declaration of goods to the clearance authority 470 may be implemented during process 535. As described, the clearance authority 470 may include the customs agency for a country. For example, the United States authorizes the U.S. Customs and Border Protection for clearing shipments through customs. However, many countries authorize several agencies to provide clearance for a given shipment. As such, in various embodiments, the clearance authority 470 may include the customs agency but in some other embodiments, the clearance authority 470 may include the customs agency and also additional government agencies in the import country.

Phase 5 of FIG. 5: Retrain Knowledgebase Using Prediction Feedback System

The aforementioned systems may determine duties and taxes based on knowledge of the tariff code, which may in turn point to the appropriate information/data from classification knowledgebase 500. As previously described, complete and accurate tariff codes for all items in a shipment may not always be provided to a carrier. Frequently, an originator may provide only a description and part number of the goods shipped. The part number may not have any global significance, and the description may not comport with internationally recognized goods descriptions. Since the broker may be responsible for navigating the maze of regulatory requirements and determining the taxes, duties, and fees, the broker may have a need to readily determine the appropriate tariff code for the commodities being shipped.

Thus, there is a need for a process 540 and 545, as described in FIG. 5, for retraining the classification knowledgebase 500 using a prediction feedback system 1300 that accommodates shipments, where the originator provides less than complete and/or incorrect tariff codes identifying the goods. As will be recognized, the classification prediction system 100 may be scalable to accommodate all countries with an active importation process. For example, for purposes of illustration and not of limitation, the classification prediction system 100 may be configured to manage a carrier's shipments between the United States and Canada as well as have the capacity to manage a carrier's shipments also involving the United States and Germany.

Such a configuration may allow the classification prediction system 100 to maintain the rules and associated information/data (e.g., comprising rates, fees, duties, and/or the like) for each importing country. Furthermore, such a configuration may allow for retraining the classification knowledgebase 500 using a prediction feedback system 1300 such that every time a country's regulations change (e.g., new rules or altering duties, and/or the like), the prediction feedback system 1300 may modify the applicable information/data in the classification knowledgebase 500 to reflect these changes. This process is described in greater detail in FIG. 13.

Step/Operation 540 of FIG. 5: Leverage Feedback from Predictions to Increase Accuracy/Confidence In an embodiment, the predictions/classifications 502 are provided to the system for leveraging via process 519. In an embodiment, the predictions/classifications 502 determined by the prediction classification system 100 are directed through a continuous feedback loop to increase the accuracy and/or confidence levels of the algorithms of prediction classification system 100. As previously noted, the algorithms are determined and/or optimized through machine learning techniques.

In various embodiments, the prediction classification system 100 may further leverage the prediction feedback system 1300 to record and/or analyze released information/data, shipment information/data and/or the like corresponding to historical brokerage transactions, which may be collected and/or aggregated and stored in classification knowledgebase 500, to learn from feedback from customs agencies or company resources to apply to future transactions (e.g., shipments/commodities).

Step/Operation 545 of FIG. 5: Incorporate Feedback into System

In one embodiment, the information/data 547 obtained through leveraging the prediction feedback system 1300 may be incorporated back into the classification knowledgebase 500 by the prediction classification system. This process is described in greater detail in FIG. 13.

Classification Layers

It is readily evident that consistent assessment of tariffs and duties typically requires a well-defined international goods classification scheme. This is the purpose of the Harmonized System of Goods. Manufacturers, transporters, exporters, importers, customs officials, statisticians, and others often use the system for classifying goods for international trade under a single commodity code. To facilitate the import process, most countries have adopted this international goods classification scheme for categorizing goods.

With reference to FIG. 6, there are three distinct "layers" or levels of predictions that may be made by the classification prediction system 100 to comport to an international commodity description provided by the WCO. Notably, the WCO is an international standards body that was created to aid in international trade and to maintain the Harmonized Systems of goods nomenclature. The commodity description provided by the WCO is often referred to as the "Harmonized Tariff Code," but also may be referred to herein interchangeably as the HTC Code, the Harmonized System Code (or HS Code), tariff code, and/or the HTS Code.

The first layer may involve harmonizing a commodity. In an embodiment, this may consist of determining the Chapter, Heading and Subheading for the good/commodity, according to the WCO. The resulting reference number may be the HTC code previously described. For example, the HTC Code 0901.11 represents "not-decaffeinated coffee" in the coffee heading of the "coffee, tea, mate and spices" chapter. This level of the Harmonized Tariff Schedule is common to all countries that follow the WCO standard.

While the scheme is international in nature and authority, the treatment for goods of a given classification is national in nature and may vary by each importing country. Some countries may define sublevels of classifications. Determining the duties and tariffs associated with a shipment typically requires knowledge of not only the importing country's regulatory requirements, but also the rules of how that country applies the international classification system. Accordingly, the second layer disclosed in FIG. 6 may involve classifying the commodity to the specific tariff code for the import country, also referred to herein as the "commodity code." The commodity code (also referred to herein as the fully qualified tariff code) may be determined by assigning an eight to ten digit tariff code to the commodity.

The third layer may involve determining and applying the special treatment code of the commodity. The special treatment code is sometimes referred to herein as the treatment code, the special treatment program (STP) code, the special tariff program, the preferential treatment program, and/or simply the program. The program is defined by the import country that allows the country to grant preferential rates for importation based on a number of factors determined by the clearance authority. This is also sometimes referred to as "the column." The treatment can either be general or one of many preferential programs determined by the import country.

In various embodiments, the prediction classification system 100 may be configured to harmonize and classify a given commodity, which may result in assigning the fully qualified import country's tariff code. In an embodiment, the prediction classification system 100 may also determine the applicable special treatment program of international commodities for the purpose of importation.

In various embodiments, tariff schedules from any country with an importation process in place may be collected and aggregated by the classification knowledgebase 500. For example, as previously noted, the requirements to obtain clearance from the local governmental customs office may vary from country to country, but often follow similar procedures. As such, the prediction classification system 100 may index tariff schedule information/data in the classification knowledgebase 500 in a manner such that the prediction classification system 100 enables classification predictions corresponding to one country based at least in part on information/data about importing that same commodity in a second country.

Classifying Commodity to the HTC

In an embodiment, if a commodity has an appropriate Chapter, Heading and Subheading in the WCO harmonized nomenclature, the prediction classification system 100 may "harmonize" the commodity. This harmonization process comprises classifying the commodity by assigning the Chapter, Heading and Subheading of the WCO, resulting in a six digit HTC prediction. For example, if the Chapter, Heading and Subheading can be determined, it is frequently possible to determine the proper six digit HTC. Many of the subheadings only include a single section. In this scenario, the classification prediction system 100 may make a HTC prediction with high confidence. In other scenarios, one or more sections may be predicted based on a keyword query in the classification knowledgebase 500 by indexing both the tariff schedule description and the invoice line description. Most subheadings may also contain an "other" section that may be predicted with a low confidence weight.

In an embodiment, since all of the countries that follow the WCO standard share similar information/data fields in the classification knowledgebase 500, the HTC Code may be referenced and/or predicted by querying the classification knowledge base 500 across all of the import countries. Moreover, by classifying in this manner, the classification prediction system 100 may avoid the obvious pitfalls associated with classifying commodities based on a natural language query—which may be for example—of a part description of the commodity. In addition, classifying a commodity to the HTC may allow the classification prediction system 100 to reference a commodity with more information/data fields that could subsequently be leveraged to make predictions in the other classification layers.

As will be recognized, the classification prediction system 100 may determine the HTC through a variety of methods. For example, the classification prediction system 100 may query the classification knowledgebase 500 for similar descriptions from a commodity catalog 452 previously collected. This example may allow successful classification even when the commodity being searched and the referenced commodity have different respective part numbers, as is often the scenario when a commodity merely varies by size and/or color.

In an embodiment, the classification prediction system 100 may query the classification knowledgebase 500 for similar descriptions in a tariff schedule previously transmitted to the classification knowledgebase 500 by the clearance authority 470. Any corresponding predictions made in this manner would naturally have a unique identification (as previously described) and may be weighted for confidence.

FIGS. 7A and 7B illustrate this concept of Classifying a Commodity to the HTC with exemplary information/data corresponding to the HTC Code. Referring to the coffee example earlier, FIG. 7A illustrates the "coffee, tea, mate and spices" chapter. Similarly in FIG. 7B, the chapter 700 corresponds to "Electrical transformers, static converters (for example rectifiers) and inductors."

Referring back to FIG. 7A, the heading 705 for the exemplary "coffee" commodity is 09.01. As can be seen, this heading 705 is closely related to HS Code 710 in which the first four digits of the six-digit HS code corresponds to the chapter 700 and the heading 705. In an embodiment, the prediction classification system 100 may concatenate the heading onto the chapter and remove any non-numerical characters (e.g., the ',' character or the '.' character) to accurately predict the HTC.

Classifying Commodity to the Country-Specific Commodity Codes

In the United States import classification system, the HTS administered by the U.S. International Trade Commission (USITC), and the U.S. export classification system, the Schedule B administered by the U.S. Census Bureau, Foreign Trade Division, each provide country-specific commodity codes for their respective systems. Moreover, each of the systems rely on the international HS codes determined from classifying to the HTC. Consequently, the classification prediction system 100 may leverage the classifications.

As previously noted, the tariff schedules from a variety of countries may be collected and aggregated by the classification knowledgebase 500. Accordingly, the prediction classification system 100 may utilize the tariff schedule information/data in the knowledgebase 500 to determine the appropriate commodity code.

Referring to FIG. 8A, a commodity code 800 for the exemplary "coffee" commodity is illustrated as 0901.11.0000 in the Schedule B classification system. Similarly in FIG. 8B, the commodity code for ballasts is 8504.10.0000. FIGS. 8A and 8B also illustrate by way of example, other data/information that may be utilized by the prediction classification system 100. For example, FIGS. 8A and 8B show the Schedule B commodity code 800, the HTC heading 705, the HTC chapter 700, unit of quantity as well as a commodity description. In various embodiments the country-specific commodity codes may be determined by utilizing such information/data stored in the classification knowledgebase 500. In an embodiment, this information/data may be imported from a third party entity and stored in the classification knowledgebase 500 by connecting a tariff management server 120 to classification prediction system 100. For example, the tariff management server can provide tariff schedule data (e.g., Schedule B data) to the classification knowledgebase 500 via network 105.

Classifying Commodity to the STP

In some embodiments, information/data may be acquired by the classification prediction system 100 to classify commodities to the special treatment program (STP). In an embodiment, the classification prediction system 100 may determine the STP by utilizing information/data sourced by the commodity catalog (e.g., commodity catalog 452) and stored in classification knowledgebase 500.

In various embodiments, the commodity catalog may provide the classification knowledgebase 500 the proper classification data/information as well as the applicable special treatment program data. Furthermore, the commodity catalog (e.g., commodity catalog 452) may also provide ancillary information/data such as, for example, any reusable license, certificate or permit information/data associated with a commodity. As discussed herein, this ancillary information/data may be required by the customs authority 470 as a verification that the commodity applies under the declared special treatment program. FIGS. 11A and 11B illustrate examples of ancillary information/data 1100 and 1110 respectively.

In various embodiments, the STP classification may be determined by the classification prediction system 100 by leveraging historical brokerage transactions of the same good(s). In this manner, a good(s) may be identified by the part number and/or part description provided on the commercial invoice 512. As will be recognized, the relevant information/data applicable to the STP may be determined from the prediction feedback system 1300 in a manner described in detail in FIG. 13.

In an embodiment, the classification prediction system 100 may infer the appropriate STP by leveraging the predetermined HTC. For example, in an instance in which the classification prediction system 100 is classified with a high confidence level, the classification prediction system 100 may utilize this information/data and query for all applicable programs corresponding to the HTC classification and the country of origin. Alternatively, in an instance in which the STP requires more than the country of origin, the classification prediction system 100 may leverage historical brokerage transactions of the same and/or similar goods.

Referring to FIG. 9, an exemplary list of special treatment programs and their corresponding countries of origin is illustrated. FIG. 9 also illustrates the STP code and STP description, both of which may be utilized by the prediction classification system 100 to classify commodities.

Referring to FIG. 10A, STP codes and their corresponding countries of origin for the exemplary "ballast" commodity are illustrated. Similarly, FIG. 10B illustrates the corresponding countries of origin information/data set for the "coffee" commodity, which in this example, is not eligible for any of the special treatment programs listed.

Extending the commodity example further, the classification prediction system 100 may utilize the predetermined HS code 8504.10 and/or the commodity code 8504.10.0000 to determine a preferential (e.g., duty-free or reduced rate) tariff program applicable to the ballast commodity. In this scenario, in an instance in which the country of origin was Chile, the classification prediction system 100 may use the HS code and/or commodity code to determine the eligible STP code "CL."

Ancillary Data

FIGS. 11A and 11B illustrate example data/information that may be stored in the classification knowledgebase 500 and which may be leveraged by the classification prediction system 100 to assist in determining the classifications.

Referring to FIG. 11A, an exemplary list of ancillary information/data 1100 in the form of preferential treatment agreements is illustrated. As can be seen in FIG. 11A, ancillary information/data 1100 illustrates information/data values associated with the particular agreement name, the coverage, and the applied preferential treatment program, all of which may be stored in the classification knowledgebase 500 and utilized by the prediction classification system 100 to classify commodities. FIG. 11B similarly illustrates ancillary information/data 1110 in the form of licensing information/data for a given commodity.

Referring back to the ballast commodity example, the classification prediction system 100 may not know the STP code initially. However, the classification prediction system 100 may utilize the determined HS code to identify if the STP code requires licensing. For example, the classification prediction system 100 may query against the ancillary information/data 1110 stored in the classification knowledgebase 500 to determine the applicable STP code as well as the measures and/or conditions for proper classification. For example, the classification prediction system 100 may query the ancillary information/data 1110 stored in the classification knowledgebase 500 with the country of origin as Mexico, the HS code 0901.11, and/or the commodity code 0901.11.0000 to determine if the commodity may be eligible for a duty-free or reduced rate. The classification prediction system 100 may determine the measures and conditions associated with NAFTA programs.

Furthermore, if the commodity has a specific quota (also referred to herein as coverage) of eligible quantities, the classification prediction system 100 may determine that information/data in a similar manner, as described herein.

Exemplary Classification Process

Referring now to FIG. 12, an exemplary diagram of the flexibility of the classification process is illustrated. In an embodiment, FIG. 12 describes process 525 of FIG. 5 in more detail.

Step/Operation 1200/1205 of FIG. 12: Receive Shipment Information/Data & Get Commodity In one embodiment, classification may begin in an instance in which the classification prediction system 100 retrieves a commercial invoice 512 (e.g., by generating the commercial invoice) from shipper 400. The system 100 may then retrieve all commodities 1207 from the commercial invoice 512.

In an embodiment, after retrieving commercial invoice 512 (step/operation 1200), the system 100 may prepare the data for classification by cleaning, transforming, truncated, and/or the like. The resulting data 1203 may then be retrieved to step 1205.

Step/Operation 1210 of FIG. 12: Determine Classification Method

In one embodiment, the classification prediction system 100 may default to processing the shipment automatically. In another embodiment, the user of the system 100 may override the automatic nature of the system by invoking an assisted classification, as can be seen in process 1210. Alternatively, if the automatic classification is initiated, the classification prediction system 100 may begin by reading the initial commodity on the commercial invoice 512.

Step/Operation 1250 of FIG. 12: Compare Commodity with Knowledgebase

In one embodiment, the classification prediction system 100 may utilize machine learning techniques to compare commodity with the classification knowledgebase 500.

In various embodiments, the classification knowledgebase 500 is queried against and ranked based in part on contextual matches. In this manner, the commodity is compared to the information/data 1252 from the classification knowledgebase 500. When the best match is determined, a confidence level is calculated by the classification prediction system 100.

Step/Operation 1255 of FIG. 12: Determine/Record Confidence Level of Match In one embodiment, the factors and/or information/data fields used to determine confidence level for predictions may include a ranking list, based on such fields. In an embodiment, the ranking of the information/data fields may be (a) part number, (b) country of origin, (c) country of importation, (d) part description, (e) ancillary information/data such as licenses, and (f) ancillary information/data such as certificates. Other factors impacting the confidence level may include a comparison of the importer and/or exporter with the consignee and/or shipper.

Once the commodity has been rated, the workstation determines and records the confidence level of the commodity 466. Although not shown, the classification prediction system 100 may record other related information/data from the classification profile, such as other procedures unique for rating the commodity.

Step/Operation 1260 of FIG. 12: Determine if Unprocessed Commodities Remain In one embodiment, if there are any more commodities to be queried, the process is repeated.

Step/Operation 1265 of FIG. 12: Compare Lowest Confidence Level Prediction with Threshold Value In one embodiment, the classification prediction system 100 may compare the confidence level of the commodity and compares it to the predefined threshold value.

Alternatively, the classification prediction system 100 may process all commodities in a shipment and delay comparison until all records are completed. In this scenario, the classification prediction system 100 may then examine the lowest confidence level for a commodity in the shipment. Essentially, the lowest confidence of any commodity in the shipment signifies the confidence level of the entire shipment.

Step/Operation 1270/1275/1280 of FIG. 12: Determine Process Based on Confidence Level Prediction In one embodiment, if the determined confidence level is above a first predefined threshold, then the commodity may be accepted and auto classifying is completed by the classification prediction system 100. On the other hand, if the determined confidence level is below the first predefined threshold, but above a second predefined threshold, the classification prediction system 100 may elect to select the applicable commodity (step/operation 1275) and process the commodity using the assisted classification process (step/operation 1280) beginning with process 1215. In this manner, the classification prediction system 100 may request the user (also known as a rater) to manually review the pending classification and request approval for each item's rating. After confirmation is completed, the classification may be completed. In this example, if the confidence level is below both the first and the second predefined thresholds, the classification prediction system 100 may elect to discard all predictions and process the commodity using the assisted classification process beginning with process 1215. As noted, the assisted process is illustrated in FIG. 12, starting with the assisted selection at determining step 1210.

Exemplary Assisted Classification Process

In FIG. 12, the process 1215 of querying historical classification profiles is implemented when the user elects to follow an assisted classification procedure. In this scenario, the classification prediction system 100 may be operatively connected to a user computing entity 110 through network 105 to retrieve display information/data and/or retrieve input where the process may require user intervention to continue operation. In this scenario, classification begins when the classification prediction system 100 retrieves a commercial invoice 512 (e.g., by generating the commercial invoice) from shipper 400. The classification prediction system 100 may then retrieve all commodities from the commercial invoice 512, and loop through each commodity until the user has reviewed all commodities listed on the commercial invoice 512.

In this embodiment, the classification prediction system 100 may query and retrieve all associated classification profiles from the classification knowledgebase 500. Generally, more than one of such classification profiles corresponding to a particular commodity may be present in the classification knowledgebase 500. In such scenarios, the classification prediction system 100 may present a list of potential profiles to the user. In this embodiment, the classification prediction system 100 may accept locally programmed rules that define criteria used to determine a match, the relative weights to assign to each criteria, and how information/data is presented such that a presentation order is based on a weighting of the classification profile match according to confidence levels. For example, the classification prediction system 100 may determine confidence levels, then present and list the predicted commodities to the user from most-likely-to-match to least-likely-to-match. Alternatively, the classification prediction system 100 may define the criteria used to determine a match, the relative weights to assign to each criteria, and the manner in which information/data is presented. The values and weights used in assisted rating may be different than the values used in automatic rating.

Following process 1215, process 1220 determines if a historical classification profile is acceptable when the user elects to follow an assisted classification procedure. In this manner, the contents of the classification profile may be presented to the user for review. The user may then manually compare the classification profile with the shipment's commodity information/data to determine whether there is an appropriate classification profile to select. If there is, the classification prediction system 100 follows processes 1230 and 1235 to continue classification. For example, the user selects and applies the appropriate classification profile, in steps 1230 and 1235, for the classification prediction system 100 to use in rating the commodity and classification for that commodity is complete.

If the classification prediction system 100 receives input from the user that none of the clearance profiles are acceptable, the user may edit the query parameters, as seen in process 1220, and/or retrieve other classification profiles until an appropriate profile is found. Once selected, the classification profile is used, by the classification prediction system, to classify the commodity with the selected data/information.

In an alternative embodiment, the classification process may be further configured locally using rules and scripts programmed in a user computing entity 110. In this alternative embodiment, the automatic rating processes may be processed on unattended workstations, but the same application may be executed on attended workstations (but without user interaction). In the previous example, the rating process could have been defined so that only assisted rating occurs.

In another embodiment, the rating process may also allow configuring the confidence weighting levels and confidence thresholds for automatic versus assisted classification. In this manner, automatic rating may occur by operating on all commodities in a commercial invoice, or, as described above, on a per-commodity basis. Alternatively, when comparing the commodities in the shipment, the rules and processing scripts may specify weighting levels use of either the commodity catalog 512 or the historical brokerage transactions information/data sources.

In another embodiment, the classification process may further be configurable by country of origin regarding how shipments are classified.

Exemplary Feedback Prediction Process

Reference will now be made to FIG. 13. As will be recognized, contingent on the velocity of regulatory changes and how a brokerage computer system is structured, the regulatory changes may require altering existing information/data values or altering procedures for processing a shipment. Consequently, the exemplary prediction feedback system 1300 illustrated in FIG. 13 provides a flexible, efficient, and scalable system to assist the classification prediction system 100 in facilitating management of international trade to provide rating and clearance status information.

As will be recognized, it may be beneficial to the machine learning techniques described herein to record all predictions/classifications 502 made for a commodity from the commercial invoice 512. In this manner, the overall classification process may continuously compare the predictions made to the accepted clearance information/data 1314, which may be stored in classification knowledgebase 500. In various embodiments, the prediction classification system 100 may track the predictions throughout the shipment lifecycle and associate all processed commodities to their corresponding predictions in the classification knowledgebase 500.

In an embodiment, the continuous cycle of prediction, feedback and learning may generate an increase in the confidence levels of accurate predictions and a decrease in the confidence levels in inaccurate predictions, making them negligible. Further, this prediction feedback system 1300 may enable new countries and/or commodities to be added into the system 100 with immediate benefit to that country, which can be accomplished without degradation of the predictions to other countries/commodities.

In one embodiment, the classification prediction system 100 may make a series of predictions/classifications 502 for each commodity on a commercial invoice. Upon clearance, the classification prediction system 100 may receive the actual classification feedback to validate against the predictions/classifications 502.

In one embodiment, the prediction feedback system 1300 may primarily utilize the commodity catalog stored in the classification knowledgebase 500 with a secondary reference to the other information/data sources stored in the classification knowledgebase 500.

Step/Operation 1301/1305/1310/1320 of FIG. 13: Periodically Check for New Clearance Information/Data and Initiate Processing In one embodiment, the classification prediction system 100 may periodically check for released clearance information/data 1314 that has been added to the classification knowledgebase 500 (step/operation 1301). Upon determining that new information/data has been added, for example in process 1305, the classification prediction system 100 may trigger the prediction feedback system 1300 to initiate processing. Once the prediction feedback system 1300 initiates, the prediction feedback system 1300 may obtain the accepted clearance information/data 1312 from classification knowledgebase 500 (as illustrated in process 1310 of FIG. 13) and identify/classify all associated predictions, for example, as in process 1320.

Step/Operation 1325/1330/1339 of FIG. 13: Determine if Commodity Prediction was Correct In an embodiment, when the feedback is received on the predictions/classifications 502, the classification prediction system 100 may record the correct predictions in step 1325 and may analyze all associated information/data (e.g., through machine learning techniques) pertaining to the prediction 502. This information/data may be utilized by the classification prediction system 100 to determine if there are reusable values, such as licenses, certificates and/or permits that can be used to optimize future predictions made by the classification prediction system 100.

In an embodiment, if the prediction 502 was determined to be correct, the classification prediction system 100 may flag the correct prediction and may increase the confidence level by a factor. This process may repeated by a determining step 1330 until all new clearance information/data has been processed, upon which the process will conclude at the ending step 1399.

Step/Operation 1335 of FIG. 13: Determine if Classification Predictions are Above Threshold In one embodiment, upon determining that a predicted classification 502 was incorrect (e.g., the predicted classification was over a predefined threshold) in step 1335, the correct prediction may be recorded by the classification prediction system 100.

Step/Operation 1340 of FIG. 13: Identify Correct Classification

In one embodiment, upon determining that a predicted classification 502 was incorrect in step 1335, the prediction feedback system 1300 may identify and assign a prediction 502 corresponding to the commodity found on the commercial invoice. For example, if the correct classification has no found association with the commercial invoice commodity in the classification knowledgebase 500, the classification prediction system 100 may generate the association to be utilized for future transactions.

Step/Operation 1345 of FIG. 13: Determine Factors for Incorrect Classification In one embodiment, in step 1345, the classification prediction system 100 may provide a more substantial analysis (e.g., by invoking step 1355) of the prediction in an instance in which the confidence level was incorrectly determined to meet the first predefined confidence level threshold (e.g., if the prediction was a "false-positive").

Step/Operation 1350/1360 of FIG. 13: Retrain System to Increase Prediction Accuracy and Reclassify In an embodiment, in step 1350, upon determining that the prediction resulted in a "false positive", machine learning techniques may be utilized, by the classification prediction system 100, to generate (or retrain) analytics for predictions 512 to look for and eliminate factors that may have led to false predictions, such that future false predictions may be eliminated and/or reduced in confidence.

In one embodiment, upon determining the various factors 1347 associated with the incorrect prediction, machine learning techniques may be utilized by the classification prediction system 100 to retrain the algorithms and further analyze/repeat until a stable and/or satisfactory prediction model is obtained.

In an embodiment, step 1350 may further include reclassifying applicable information/data (step/operation 1360) to decrease the likelihood of inaccurate predictions/classifications 502 in future scenarios that depend on the inaccurate existing classifications. This step may correct the applicable miscalculated predictions/classifications 502, resulting in reclassified data 1362. This reclassified data may be stored by prediction classification system 100 into the classification knowledgebase 500.

In an alternative embodiment, the process 1350 may, but need not, be performed on a separate "test" dataset that closely corresponds to the classification knowledgebase 500. As such, this approach may reduce any negative consequences associated with retraining the machine learning algorithms utilized by the classification prediction system 100.

Step/Operation 1355 of FIG. 13: Analyze Ancillary Data

In various embodiments, in step 1355, the ancillary information/data associated with the released clearance information/data 1314 may be compared, by the classification prediction system 100, to the ancillary information/data 1100/1110 in the classification knowledgebase to determine how much of a factor the ancillary information/data 1100/1110 had in the incorrect prediction. This process may be utilized by the classification prediction system in step 1345.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for predicting commodity classifications for a shipment, the method comprising:
    receiving an indication that delivery of the shipment has been halted at a location associated with a remote computing device associated with a customs authority;
    responsive to receiving the indication, generating, by a computing device, a commercial invoice for the shipment, wherein the commercial invoice includes a listing of commodities included in the shipment;
    predicting classifications, by the computing device, for each of the commodities listed on the commercial invoice using a knowledgebase data repository, wherein each of the predicted classifications has a confidence score;
    generating, by the computing device, a classified invoice based upon the commercial invoice and the predicted classifications;
    based upon the confidence score for each of the predicted classifications exceeding a threshold level, automatically generating, without additional interaction by a user, by the computing device, a digital customs entry having data fields for an accounting of duties, taxes and fees for the shipment based upon the classified invoice;
    automatically communicating, by the computing device, the digital customs entry to the remote computing device associated with the customs authority;
    receiving, with the computing device, a customs clearance from the customs authority in response to the communicated digital customs entry;
    responsive to receiving the customs clearance from the customs authority, causing the remote computing device associated with the customs authority to release the shipment from the location; and
    based upon receiving the customs clearance, automatically updating, by the computing device, the knowledgebase data repository.

2. The computer-implemented method of claim 1, further comprising, after said predicting classifications, providing an option, by the computing device to the user, to accept the predicted classifications, reject the predicted classifications, or review the predicted classifications during a final review or confirmation process.

3. The computer-implemented method of claim 1, further comprising, prior to said predicting classifications, presenting user-selectable options, by the computing device to the user, to enable at least one of fully-automated classifications, partially automated or assisted classifications, or manual classifications.

4. The computer-implemented method of claim 1, wherein the commercial invoice for the shipment includes details about the commodities and associated tariff codes.

5. The computer-implemented method of claim 1, wherein the classified invoice includes, for each of the commodities included in the shipment, at least one of an associated import country's tariff code or an applicable special treatment program of international commodities for a purpose of importation.

6. The computer-implemented method of claim 1, wherein predicting classifications further comprises receiving, by the computing device, at least one of information from a commodity catalog associated with the listing of commodities included in the shipment or classification information from a classification expert or broker.

7. The computer-implemented method of claim 1, further comprising, based upon the confidence score for any of the predicted classifications not exceeding the threshold level, requiring review or classification input by a subject matter expert or broker prior to generating, by the computing device, the digital customs entry having data fields for an accounting of duties, taxes and fees for the shipment.

8. The computer-implemented method of claim 1, wherein updating the knowledgebase data repository includes increasing or maintaining the confidence score for each of the predicted classifications that received the customs clearance.

9. The computer-implemented method of claim 1, further comprising, based upon receiving a denial of the customs clearance, updating, by the computing device, the knowledgebase data repository by decreasing the confidence score.

10. The computer-implemented method of claim 1, wherein updating the knowledge database repository includes recording, by the computing device, a correct classification for any of the predicted classifications that are incorrect.

11. The computer-implemented method of claim 1, wherein the confidence score is calculated based on at least one of a part number, a country of origin, a country of importation, a part description, licenses, and certificates.

12. The computer-implemented method of claim 1, wherein the confidence score is calculated based on a comparison of an importer or exporter with a consignee or shipper.

13. A non-transitory computer-readable medium storing computer-usable instructions that, when used by one or more computing devices, cause the one or more computing devices to perform operations comprising:
receiving an indication that delivery of the shipment has been halted at a location associated with a remote computing device associated with a customs authority;
responsive to receiving the indication, generating a commercial invoice for the shipment, wherein the commercial invoice includes a listing of commodities included in the shipment;
predicting classifications for each of the commodities listed on the commercial invoice using a knowledgebase data repository, wherein each of the predicted classifications has a confidence score, wherein the confidence score is calculated based on at least one of a part number, a country of origin, a country of importation, a part description, licenses, certificates, and a comparison of an importer or exporter with a consignee or shipper;
generating a classified invoice based upon the commercial invoice and the predicted classifications;
based upon the confidence score for each of the predicted classifications exceeding a threshold level, automatically generating, without additional interaction by a user, a digital customs entry having data fields for an accounting of duties, taxes and fees for the shipment based upon the classified invoice;
automatically, communicating the digital customs entry to a remote computing device associated with the customs authority;
receiving a customs clearance from the customs authority in response to the communicated digital customs entry;
responsive to receiving the customs clearance from the customs authority, causing the remote computing device associated with the customs authority to release the shipment from the location; and
based upon receiving the customs clearance, automatically updating the knowledgebase data repository via machine learning techniques.

14. The non-transitory computer-readable medium of claim 13, further comprising, after said predicting classifications, providing an option, by the computing device to the user, to accept the predicted classifications, reject the predicted classifications, or review the predicted classifications during a final review or confirmation process.

15. The non-transitory computer-readable medium of claim 13, further comprising, after said predicting classifications, presenting user-electable options, by the computing device to the user, to enable at least one of fully-automated classifications, partially automated or assisted classifications, and manual classifications.

16. The non-transitory computer-readable medium of claim 13, wherein the commercial invoice for the shipment includes details about the commodities and associated tariff codes.

17. The non-transitory computer-readable medium of claim 13, wherein the classified invoice includes, for each of the commodities included in the shipment, at least one of an associated import country's tariff code and an applicable special treatment program of international commodities for a purpose of importation.

18. The non-transitory computer-readable medium of claim 13, wherein predicting classifications further comprises receiving, by the computing device, at least one of information from a commodity catalog associated with the listing of commodities included in the shipment and classification information from a classification expert or broker.

19. The non-transitory computer-readable medium of claim 13, further comprising, based upon the confidence score for any of the predicted classifications not exceeding the threshold level, requiring review or classification input by a subject matter expert or broker prior to generating the digital customs entry having data fields for an accounting of duties, taxes and fees for the shipment.

20. A non-transitory computer-readable medium storing computer-usable instructions that, when used by one or more computing devices, cause the one or more computing devices to perform operations comprising:
receiving an indication that delivery of the shipment has been halted at a location associated with a remote computing device associated with a customs authority;
responsive to receiving the indication, generating a commercial invoice for the shipment, wherein the commercial invoice includes a listing of commodities included in the shipment;
predicting classifications for each of the commodities listed on the commercial invoice using a knowledgebase data repository, wherein each of the predicted classifications has a confidence score, wherein the confidence score is calculated based on at least one of a part number, a country of origin, a country of importation, a part description, licenses, certificates, and a comparison of an importer or exporter with a consignee or shipper;

generating a classified invoice based upon the commercial invoice and the predicted classifications;

based upon the confidence score for each of the predicted classifications exceeding a threshold level, automatically generating, without additional interaction by a user, by the computing device, a digital customs entry having data fields for an accounting of duties, taxes and fees for the shipment based upon the classified invoice;

automatically, communicating the digital customs entry to a remote computing device associated with the customs authority;

receiving a customs clearance from the customs authority in response to the communicated digital customs entry;

responsive to receiving the customs clearance from the customs authority, causing the remote computing device associated with the customs authority to release from the location; and based upon receiving the customs clearance, automatically updating the knowledgebase data repository via machine learning techniques, including increasing or maintaining the confidence score for each of the predicted classifications that received the customs clearance.

* * * * *